United States Patent
Erceg et al.

[19]

[11] Patent Number: 6,158,568
[45] Date of Patent: Dec. 12, 2000

[54] CASCADE FREE TILTING MECHANISM

[75] Inventors: David Patrick Erceg, Concord; J. David Fortenbery, Charlotte; Leroy A. Winkler, III, Stanley, all of N.C.

[73] Assignee: Mantissa Corporation, Charlotte, N.C.

[21] Appl. No.: 09/476,903

[22] Filed: Jan. 3, 2000

Related U.S. Application Data

[63] Continuation of application No. 09/033,023, Mar. 2, 1998, Pat. No. 6,009,992.

[51] Int. Cl.[7] .................................................. B65G 47/46
[52] U.S. Cl. ............................................... 198/370.04
[58] Field of Search ..................... 198/370.01, 370.04, 198/370.03

[56] References Cited

U.S. PATENT DOCUMENTS

| | | | |
|---|---|---|---|
| 4,744,454 | 5/1988 | Polling | 198/365 |
| 5,018,928 | 5/1991 | Hartlepp | 198/370.04 X |
| 5,054,601 | 10/1991 | Sjogren et al. | 198/365 |
| 5,086,905 | 2/1992 | Polling | 198/365 |
| 5,664,660 | 9/1997 | Prydtz et al. | 198/370.04 |
| 5,857,555 | 1/1999 | Maier et al. | 198/370.04 |
| 6,009,992 | 1/2000 | Erceg et al. | 198/370.04 |

FOREIGN PATENT DOCUMENTS

WO 90/09944   9/1990   WIPO .

OTHER PUBLICATIONS

Lucas Control Systems Products; Ledex Actuation Products, Copyright 1995.

*Primary Examiner*—James R. Bidwell
*Attorney, Agent, or Firm*—Rhodes & Mason, PLLC

[57] ABSTRACT

A sorting conveyor for transporting objects and unloading objects at one or more unloading stations adjacent the conveyor. Each of the tilting conveyor carts includes a trailer frame base, a carrying tray for holding the objects and a tiltable support apparatus for supporting the carrying tray above the trailer frame base and for allowing tilting of the carrying tray towards at least one side of the conveyor to unload objects into unloading stations on at least one side of the conveyor.

65 Claims, 15 Drawing Sheets

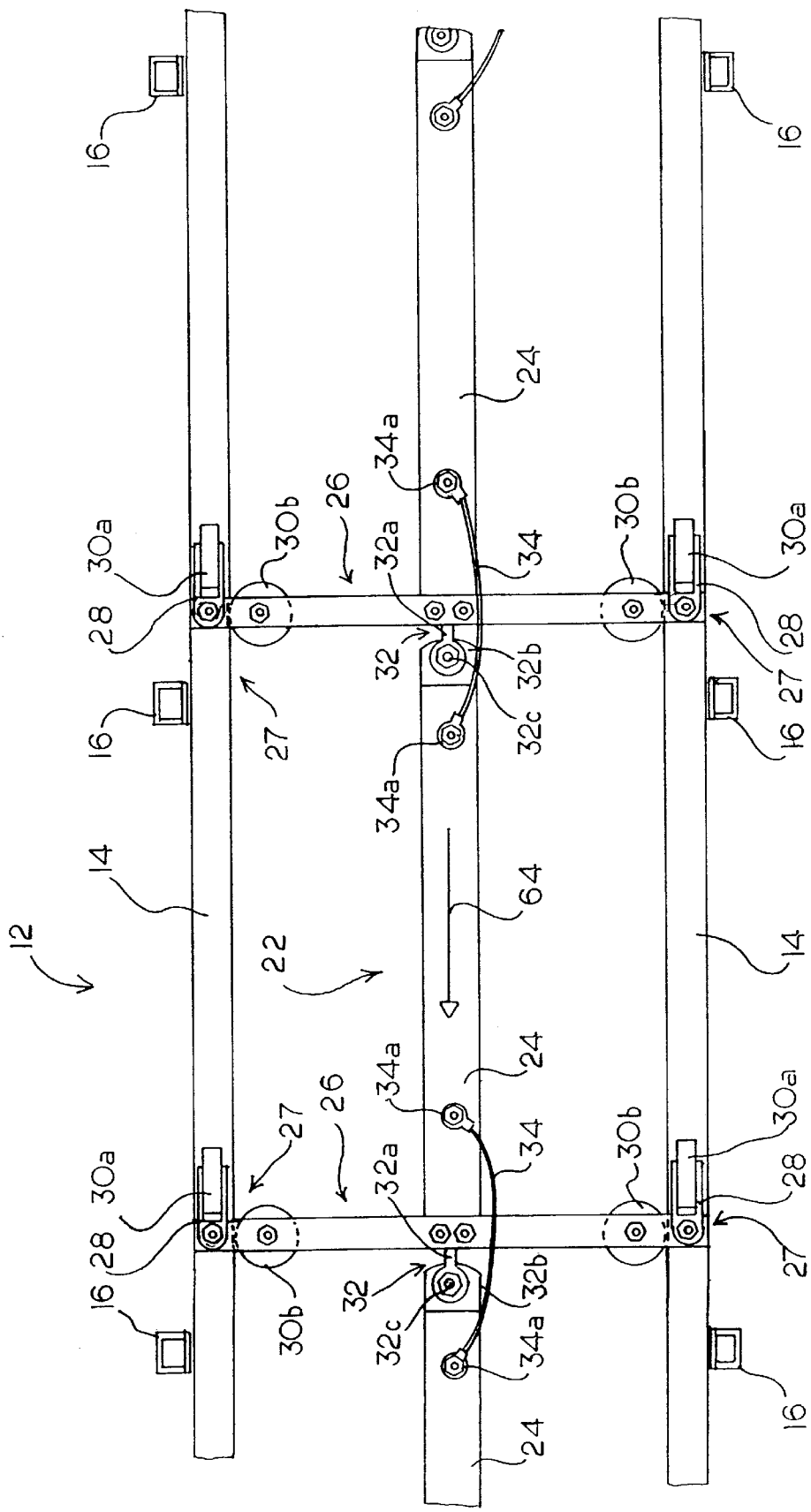

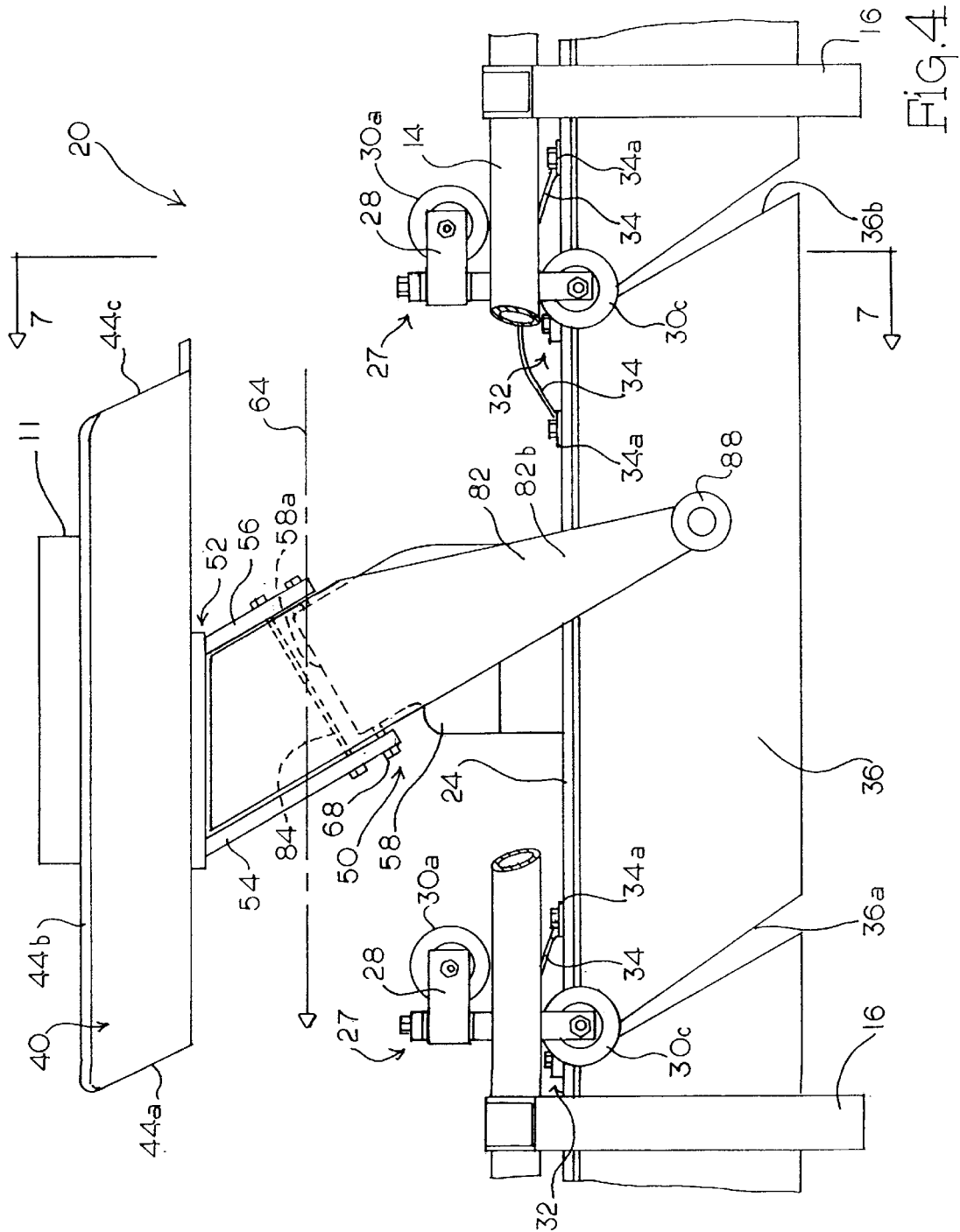

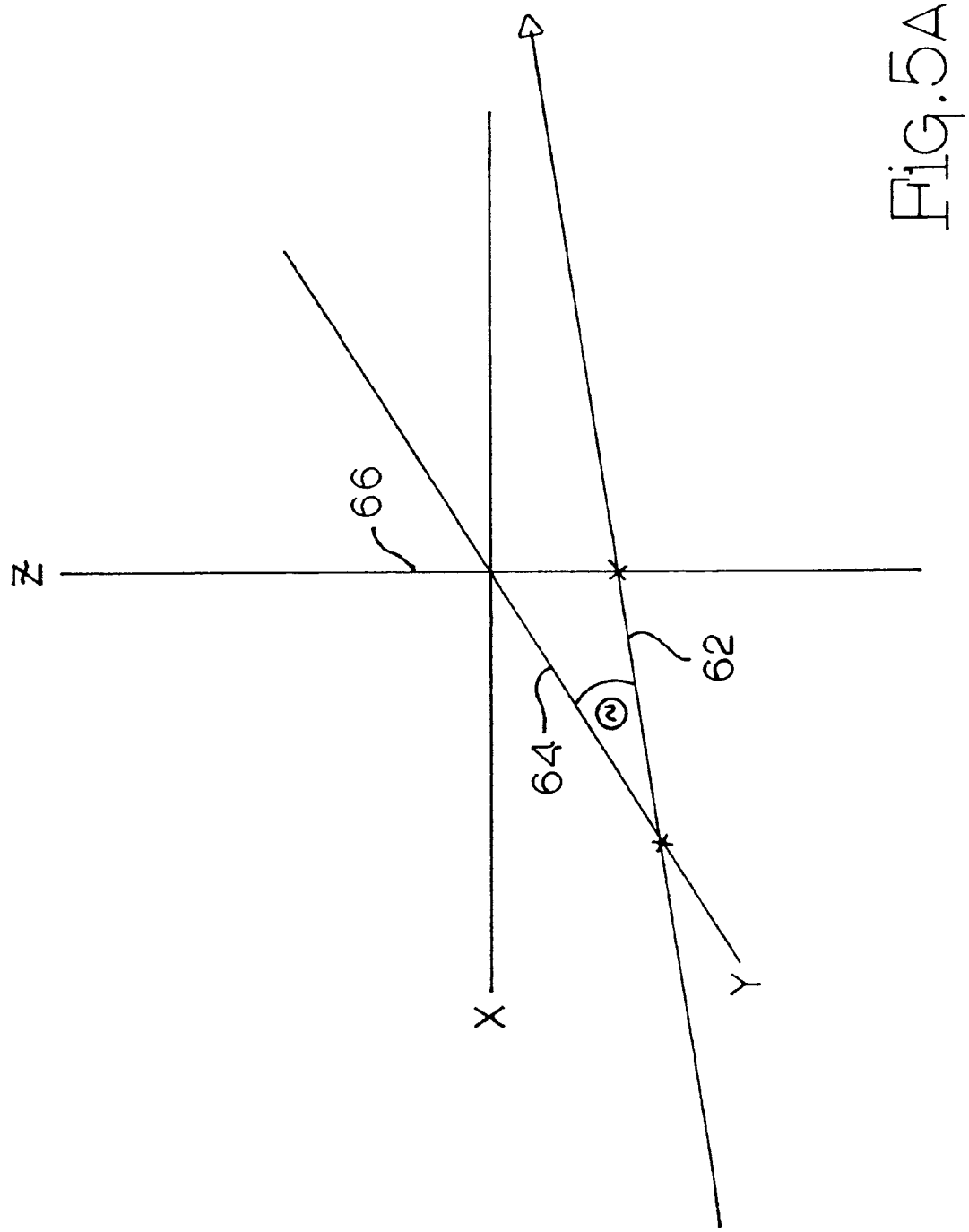

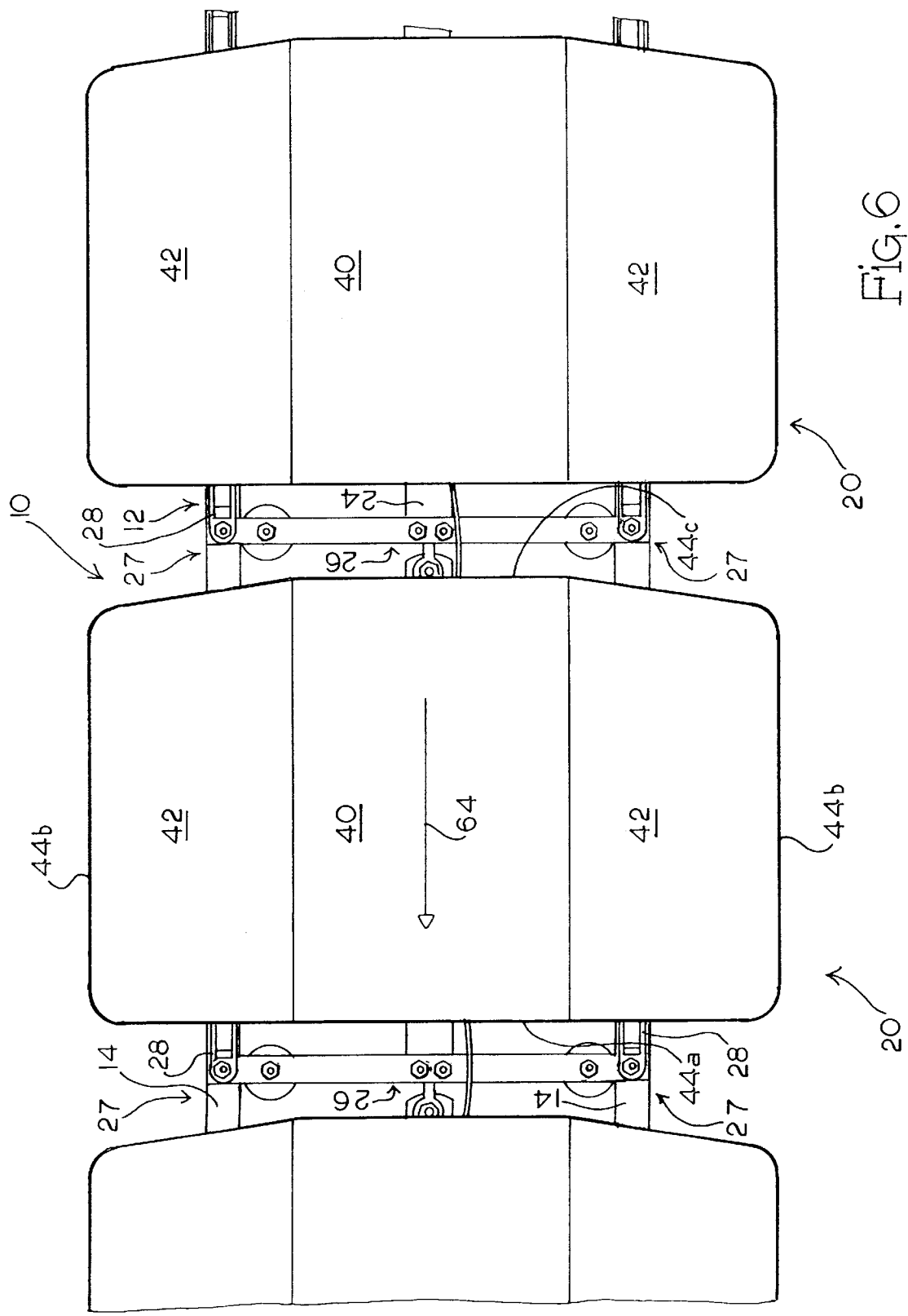

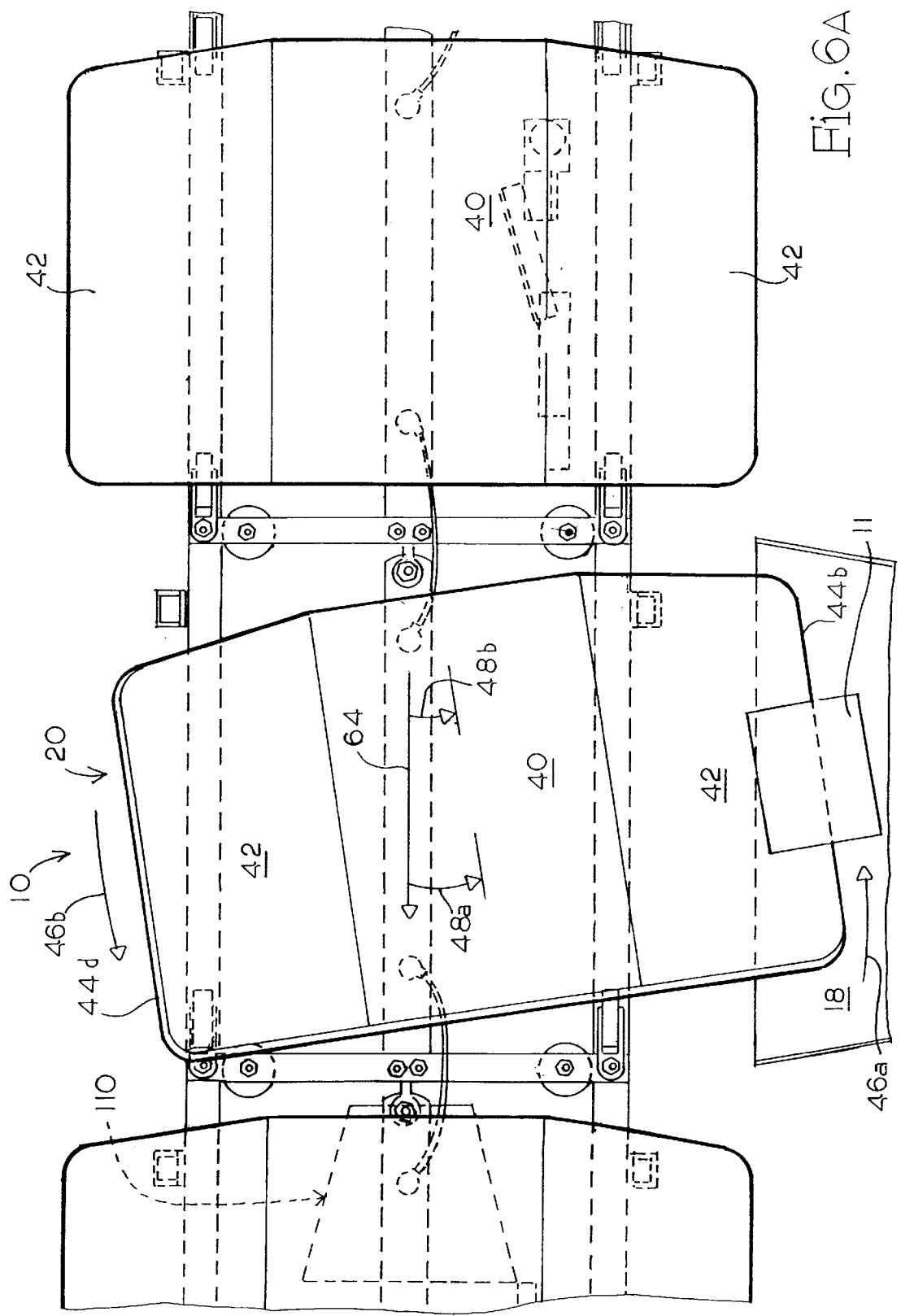

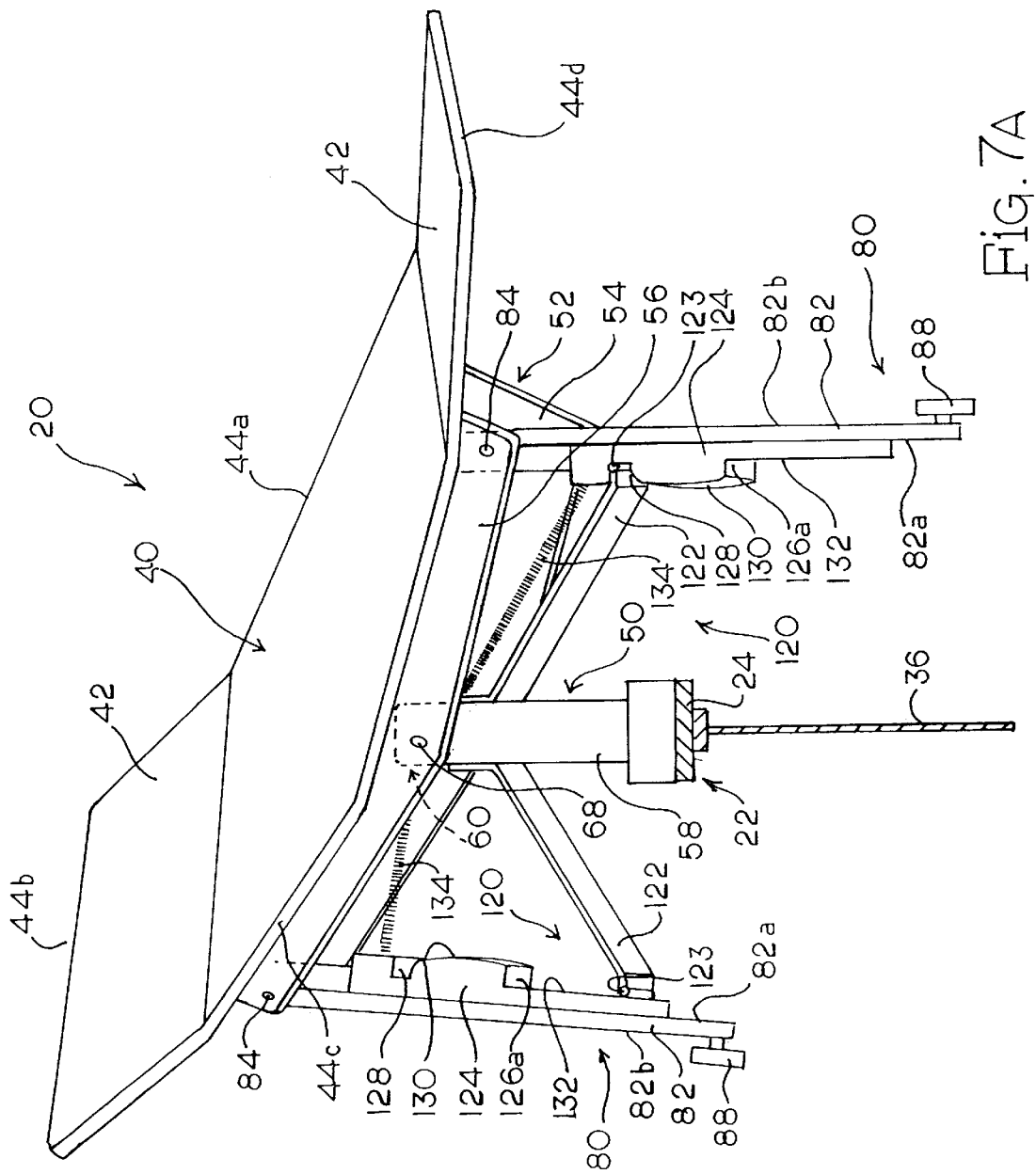

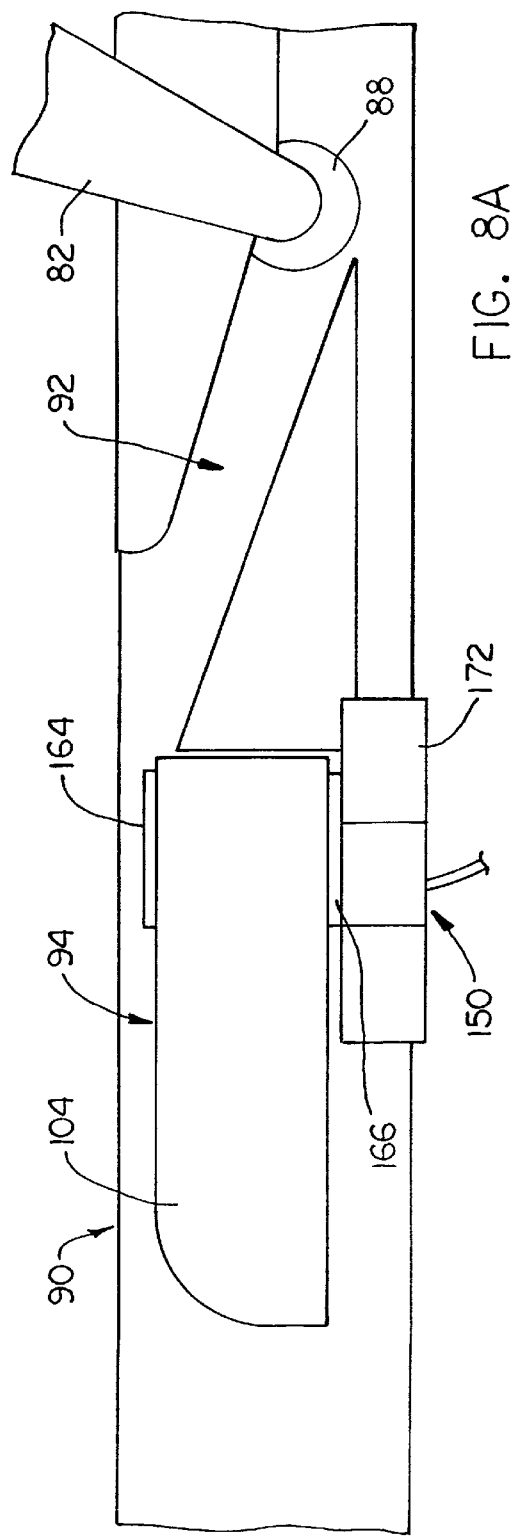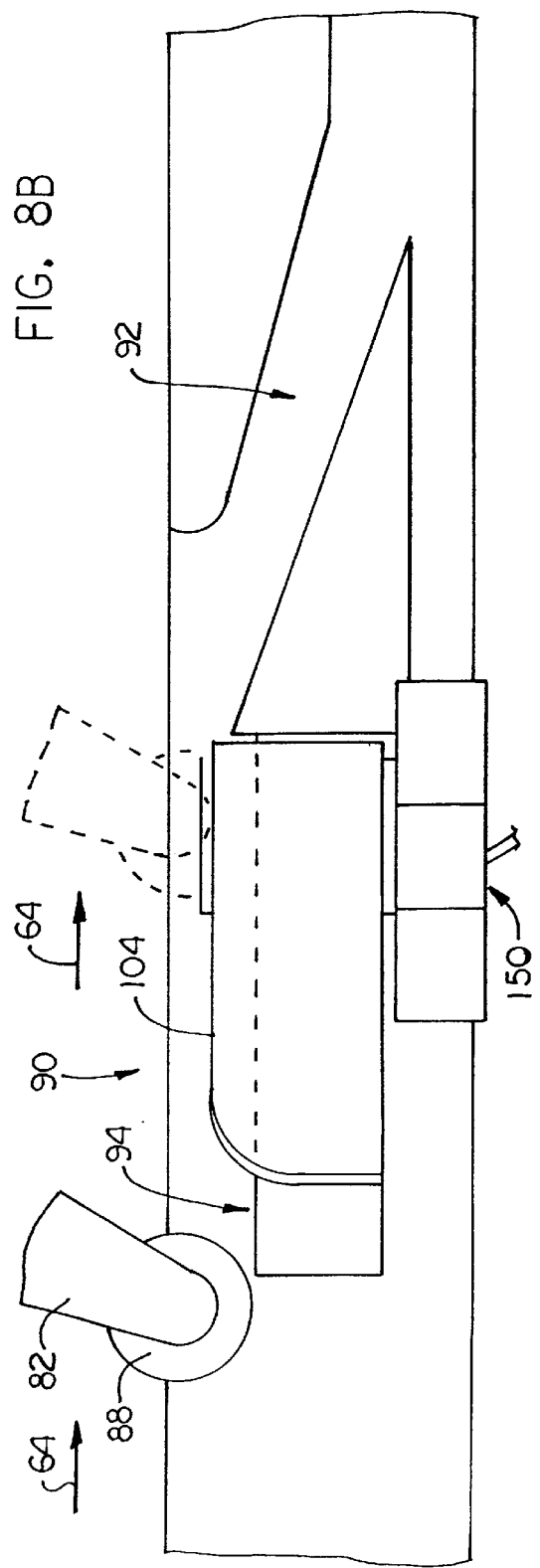

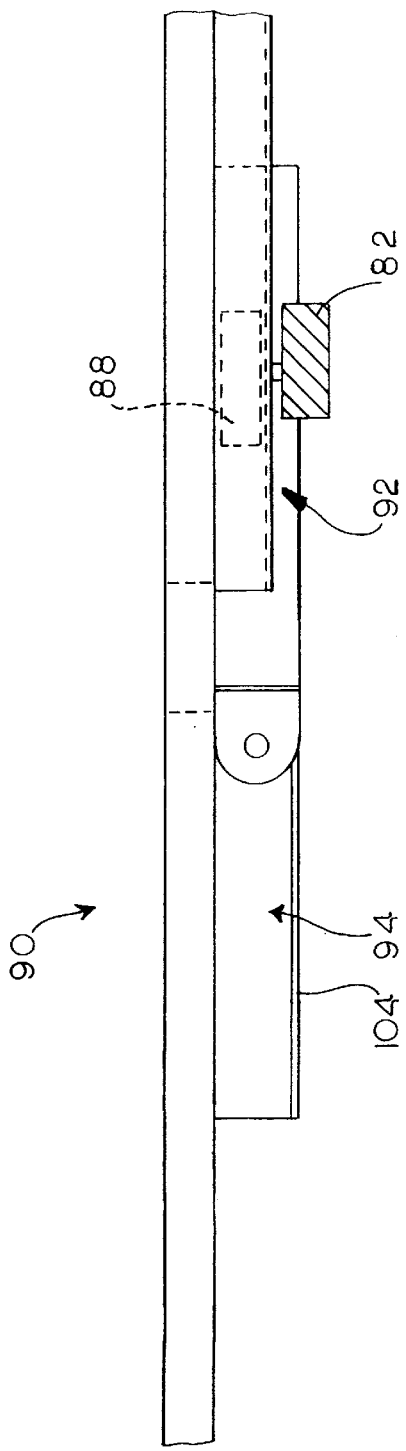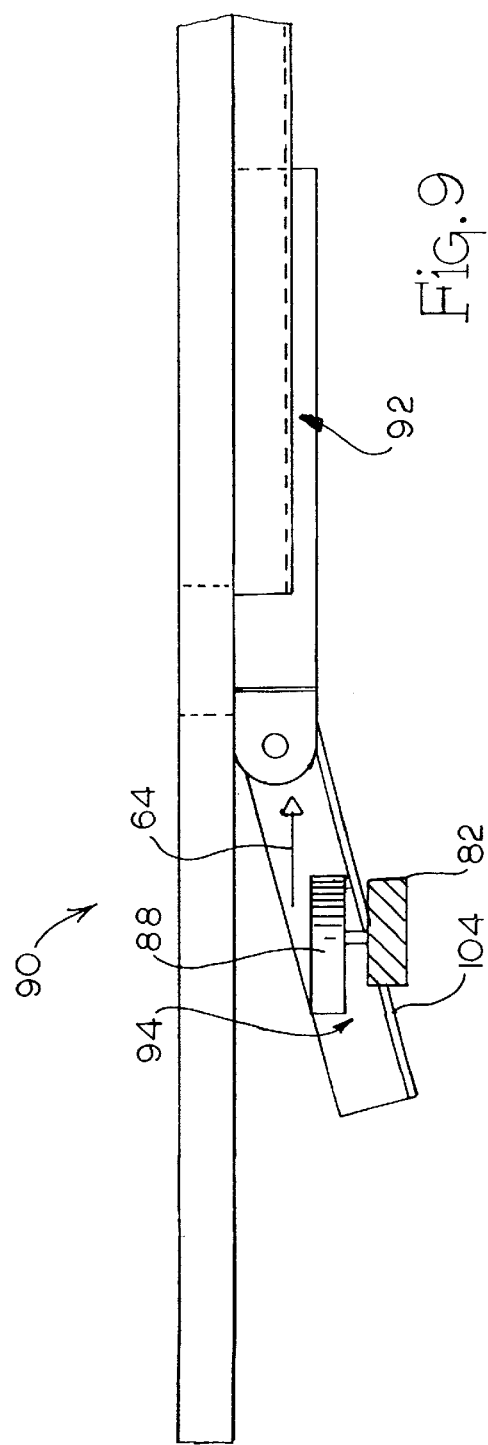

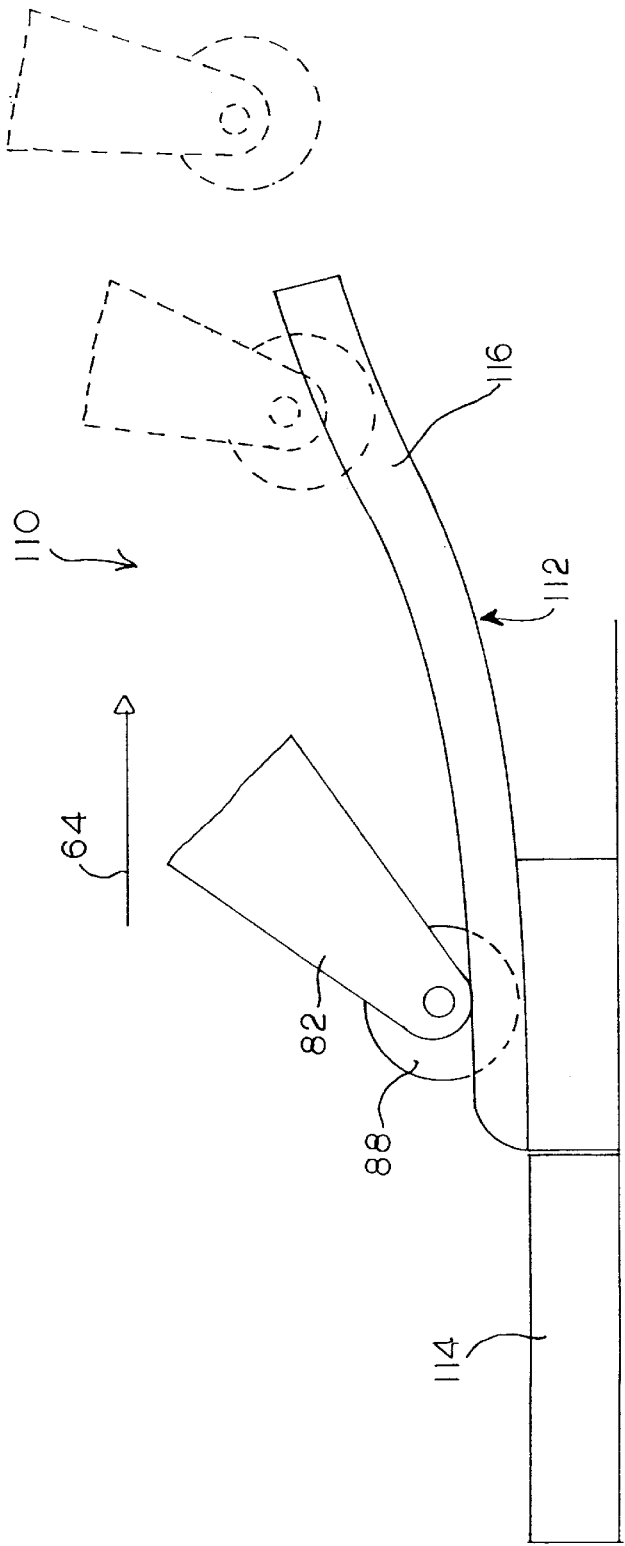
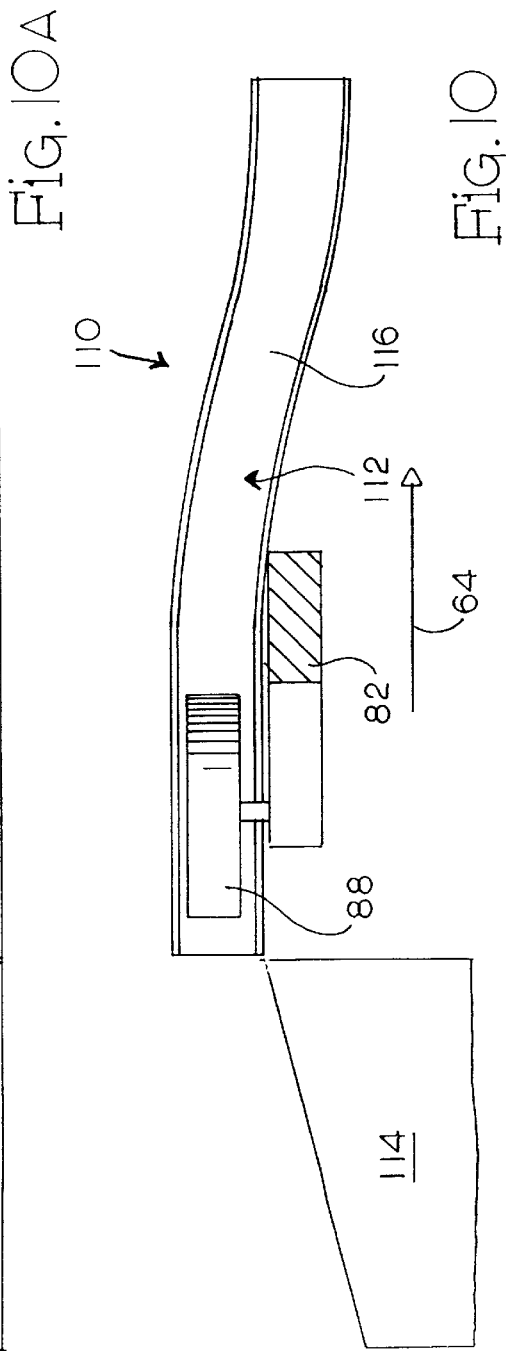
Fig. 10A
Fig. 10

CASCADE FREE TILTING MECHANISM

This application is a continuation of application Ser. No. 09/033,023 filed Mar. 2, 1998, now U.S. Pat. No. 6,009,992.

BACKGROUND OF THE INVENTION (1) Field of the Invention

The present invention relates generally to package sorting conveyors and more particularly relates to an improved tilting mechanism for a tilting conveyor cart.

(2) Description of the Related Art

Conveyor systems having a number of individual carrying carts have been commonly used for many years to carry and sort packages or other items, such as mail. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are outfeed chutes or the like for receiving packages from the carriers. When a particular carrier holding a particular package to be sorted reaches a selected outfeed chute, an actuator tilts the tray to dump the package into the outfeed chute. Another example of a typical package sorting conveyor is disclosed in International PCT Application Number PCT/DK90/00047 of Kosan Crisplant A/S.

One significant disadvantage of conventionally designed package sorting conveyors is that conventional conveyor carriers laterally tilt only on a horizontal axis parallel to the direction of conveyor travel. While this accomplishes the objective of dumping the package from the carrier into an outfeed chute or the like, the package is often roughly tumbled or rolled, sometimes damaging the package's contents. One reason for this is that the packages typically are unloaded from the carrier while still traveling forward at the same speed as the conveyor. Thus, packages tend to slam into a forward retaining wall of the outfeed chute before sliding down the chute. Another problem with conventional laterally tilting conveyors is that because the packages are moving forward at full speed when they are unloaded into the outfeed chute, the outfeed chute must be relatively wide so that packages do not miss the chute and fall off the conveyor past the chute. This often unnecessarily increases the overall size of the conveyor system.

U.S. Pat. No. 4,744,454 and an improvement thereto, U.S. Pat. No. 5,086,905, both to Pölling, disclose previous attempts to remedy this problem of rough handling by conventional laterally tilting conveyor carriers. Both of these patents to Pölling disclose a conveyor element for a package conveyor that includes a tilting carrier tray mounted to be rotatable about two swivel axes. A first swivel shaft extends obliquely downward from the underside of the carrying tray and is in turn connected at an angle to the end of a second swivel shaft extending obliquely upwards from a base support part of the conveyor element. Together, the two swivel shafts form a "V" that points in the direction of conveyor travel. Both of the swivel shafts lie in the vertical plane of symmetry of the conveyor element when the carrier tray is disposed in its upright position.

Because the carrier tray of Pölling rotates about two oblique axes, the carrier tray can be tilted not only lateral on a horizontal axis, but is moved through a geometrically complex spatial reorientation during package discharge. This allows for more gentle placement of a package on an outfeed chute than can be accomplished using conventional conveyor trays that laterally tip on only a horizontal axis. The Pölling conveyor element more gently handles the packages by imparting some degree of rearward velocity to the packages as they are discharged, which, when added to the forward velocity of the conveyor system, results in the packages' forward velocity during discharge being less than that of the conveyor system itself.

However, the conveyor elements of both of Pölling's patents are unduly complicated and intolerant of manufacturing discrepancies. In fact, the second Pölling conveyor element (U.S. Pat. No. 5,086,905) was invented in an attempt to simplify the original design disclosed in the first Pölling patent (U.S. Pat. No. 4,744,454), which had proved to be too expensive and complicated to manufacture efficiently. As a result of this complexity and cost, the Pölling devices have not enjoyed significant commercial acceptance and success.

One solution to these problems is shown in U.S. application Ser. No. 08/632,012, filed Apr. 15, 1996, which is hereby incorporated by reference in its entirety. One feature of this reference is the use of a pull-down design for tilting the improve trays.

Another example of a sorter conveyor using a pull-down design for tilting its trays is shown in U.S. Pat. No. 5,664,660, issued to Prydtz. The '660 patent is directed to a sorter conveyor having laterally tiltable transport trays, instead of a conventional transport chain driven by a driving station, in which a driving wheel or worm cooperates with the chain links, these being advanced arranged with guiding rails along a small mutual spacing and carrying both the transport trays and the tilt mechanisms associated therewith, which conventional arrangement causes considerable problems with respect to tolerances for both the longitudinal pitch of the chain links and the mounting of the guiding rails. The invention includes carts that are advanced along mutually widely spaced guiding rails, whereby the tolerance demands on the latter are reduced considerably. Also, the carts are advanced by way of stationary linear motors, which, supposedly, renders any tolerance demands on the longitudinal pitch of the tray units entirely superfluous. Also the tilting mechanisms may be given a very simple design according to the patent. However, it has been discovered that there are operational problems associated with this type of design, especially the operation of its linear motors and tilting mechanism.

While the design shown in U.S. application Ser. No. 08/632,012, filed Apr. 15, 1996 overcomes some of the problems associated with the prior art designs, some problems have begun to surface over time as the units have been operated. One of these problems is when there is a mis-tip which causes "cascading errors".

"Cascading errors" were first discovered when audits at the end of the chute indicated there were more errors occurring than were predicted by errors indicating by tray verification. Normally, when a tray is to tip to the right immediately before the tray is being straightened, a series of photocells determines if the right hand arm is in the "low" or "tipped" position, or the "up" or "latched" position. If the controls said that the arm should be tipped and the verifier says that the arm is tipped then it was assumed that the product went down the correct chute. However, in certain cases, tray verification would predict five errors but chute audits would indicate 35 errors. This previously unknown effect is referred to in this application as "cascade errors".

Most pull-down tilting mechanisms are actuated by spring when the pivot switch is released by an energizing solenoid.

In other words, the pivot switch is spring-biased in the "out" position but held in the retained position by the solenoid.

When the computer provides a pulse, the solenoid plunger retracts, enabling the pivot switch to spring into the "out" position. The wheel strikes the pivot switch in front of the pivot point and the pivot switch unlatches the carriage and then as the wheel strikes the tail of the pivot switch, it pushes the pivot switch back to the home position and the spring on the solenoid plunger pushes the plunger into a detent capturing the pivot switch in the home position. The computer initiates the unlatch but it is the action of the wheel on the tail that normally relatches it.

If the solenoid does not return to capture the pivot switch before the wheel leaves the pivot switch's tail or a wheel is missing or broken, this will allow the pivot switch to move away from its intended home position back into the engagement position. The next tilt module that is not in the down position will then strike the pivot switch, tilt, and reset the pivot switch. If the pivot switch relatches properly this time, then that particular pivot switch will cause no more errors. If the pivot switch does not relatch it can again go into the engaged position and cause additional problems.

The cascade effect, though, comes from the first carriage that was tipped incorrectly, for if it were assigned a tilt position further downstream, when that carriage (which has been tilted incorrectly) gets in position to unload, the pivot switch at the proper destination chute will move into the engagement position. But because that arm has been incorrectly tipped upstream, no action will take place and the pivot switch will stay in the out position until the next untipped carriage arrives. That carriage will then be tipped at the wrong destination but should cause that pivot switch to relatch. If that particular tray was assigned a chute destination further downstream, when it arrives at its proper destination, the pivot switch will move into the engagement position, but again cannot engage because the tilt module is already in the low position, the tilt module will pass by and will not relatch the pivot switch. This pivot switch will then stay in the out position capturing the wheel of the next tilt module that is not tipped. This error will than continue to cascade downstream until eventually the error will pass the last destination and the system should heal itself.

However, there are some conditions that can exist that cause the error to not heal itself but continue to cause problems. An example would be if a particular tilt module were missing a wheel; that tilt module could then be loaded and when it gets to its destination, the pivot switch will go out to engage the wheel but with no wheel the module will not tip. The pivot switch will then catch the next available tray beginning the cascade problem. This will continue to repeat itself and will occur and start cascade error any time the tray with the missing wheel is assigned a destination.

One attempted solution to this problem is to use the tip verification switch to shut the sorter down if the pivot switch does not return to the "home" position within a given time period. However, with a large sorter this requires a maintenance man to then check the pivot switch to see if it should be reset and whether a wheel is missing. In the meantime, everything just sits on the sorter. For time critical applications, such as airline baggage sorting, this delay may be unacceptable.

Thus, there remains a need for a new and improved tilting mechanism for tilting a conveyor tray that reduces the chance of a mis-tip while, at the same time, is an uncomplicated design that is inexpensive and simple to manufacture and service.

SUMMARY OF THE INVENTION

The present invention is directed to an improved tilting mechanism for a conveyor cart for a sorting conveyor for transporting objects and unloading objects at one or more unloading stations adjacent the conveyor. Generally, the sorting conveyor includes: a conveyor track; a train of the tilting conveyor carts connected end-to-end; and a power source for moving the conveyor carts on the conveyor track. In the preferred embodiment, the power source is a linear induction motor.

Each of the tilting conveyor carts includes a trailer frame base. The trailer frame includes a roller structure for engaging the conveyor track, a driven member responsive to the power source, and a hitch mechanism for connecting each tilting conveyor cart to an adjacent conveyor cart. The conveyor cart also includes a carrying tray for holding the objects and a tiltable support apparatus for supporting the carrying tray above the trailer frame base and for allowing tilting of the carrying tray towards at least one side of the conveyor to unload objects into unloading stations on at least one side of the conveyor.

The tilting mechanism tilts the carrying tray on the tiltable support apparatus to thereby unload objects into one of the unloading stations adjacent the conveyor. The improved tilting mechanism includes a pair of actuating arms attached to the carrying tray on opposite sides of the tiltable support apparatus and a pull-down mechanism associated with each unloading station for selectively pulling down one of the actuating arms so as to pull one side of the carrying tray downwardly and rearwardly into a tilted position.

In the present invention, each of the actuator arms includes a roller wheel on a lower end of the actuator arm, and wherein the pull-down mechanism includes a descending ramp adjacent the conveyor track, a laterally pivoting switch for directing the roller wheel of a selected actuator arm into the descending ramp and a bi-directional, rotary actuator assembly connected to the laterally pivoting switch.

In the preferred embodiment, the rotary actuator assembly includes an actuator arm having a first end and a second end, the pivot switch being connected to the first end of the actuator arm; and a bi-directional actuator attached to the actuator arm second end, whereby the rotary actuator assembly is operable to rotate the laterally pivoting switch to engage the roller wheel and direct the roller wheel of a selected actuator arm into the descending ramp and for closing the laterally pivoting switch after capture of the roller wheel.

Accordingly, one aspect of the present invention is to provide a sorting conveyor for transporting objects and unloading objects at one or more unloading stations adjacent the conveyor. The sorting conveyor includes: (a) a conveyor track; (b) a train of tilting conveyor carts connected end-to-end; (c) a power source for moving the conveyor carts on the conveyor track; (d) each of the tilting conveyor carts comprising: (i) a trailer frame base, including: a roller structure for engaging the conveyor track, a driven member responsive to the power source, and a hitch mechanism for connecting each tilting conveyor cart to an adjacent conveyor cart; (ii) a carrying tray for holding the objects; and (iii) a tiltable support apparatus for supporting the carrying tray above the trailer frame base and for allowing tilting of the carrying tray towards at least one side of the conveyor to unload objects into unloading stations on at least one side of the conveyor, the tiltable support apparatus including: (i) an upper support structure joined to the carrying tray, (ii) a lower support structure joined to the trailer frame base, and (iii) a pivot structure connecting the upper support structure to the lower support structure along a pivot axis; and (e) a tilting mechanism for tilting the carrying tray on the tiltable support apparatus to thereby unload objects into one of the unloading stations adjacent the conveyor, wherein the tilting mechanism includes: (i) a pair of actuating arms attached to the carrying tray on opposite sides of the tiltable support apparatus; and (ii) a pull-down mechanism associated with each unloading station for selectively pulling down one of the actuating arms so as to pull one side of the carrying tray downwardly and rearwardly into a tilted position; wherein each of the actuator arms includes a roller wheel on a lower end of the actuator arm, and wherein the pull-down mechanism includes a descending ramp adjacent the conveyor track, a laterally pivoting switch for directing the roller wheel of a selected actuator arm into the descending ramp and a bi-directional, rotary actuator connected to the laterally pivoting switch for opening the laterally pivoting switch so as to capture a selected roller wheel and direct the roller wheel into the descending ramp and for closing the laterally pivoting switch after capture of the roller wheel.

Another aspect of the present invention is to provide a rotary actuator assembly for a tilting mechanism for a tilting cart for a sorting conveyor, the tilting cart including a carrying tray, a tiltable support apparatus and a tilting mechanism for tilting the tiltable support apparatus on the tilting cart to thereby unload objects into one of the unloading stations adjacent the conveyor, wherein the tilting mechanism includes: (i) a pair of actuating arms attached to the carrying tray on opposite sides of the tiltable support apparatus; and (ii) a pull-down mechanism associated with each unloading station for selectively pulling down one of the actuating arms so as to pull one side of the carrying tray downwardly and rearwardly into a tilted position, wherein each of the actuator arms includes a roller wheel on a lower end of the actuator arm and wherein the pull-down mechanism includes a descending ramp adjacent the conveyor track and a laterally pivoting switch for engaging the bumper and directing the roller wheel of a selected cart actuator arm into the descending ramp. The rotary acturator assembly includes: (a) an actuator arm having a first end and a second end, the pivot switch being connected to the first end of the actuator arm; and (b) a bi-directional actuator attached to the actuator arm second end, whereby the rotary actuator assembly is operable to rotate the laterally pivoting switch to engage the roller wheel and direct the roller wheel of a selected actuator arm into the descending ramp.

Still another aspect of the present invention is to provide a sorting conveyor for transporting objects and unloading objects at one or more unloading stations adjacent the conveyor. The sorting conveyor includes: (a) a conveyor track; (b) a train of tilting conveyor carts connected end-to-end; (c) a power source for moving the conveyor carts on the conveyor track, the power source comprises a linear induction motor; (d) each of the tilting conveyor carts comprising: (i) a trailer frame base, including: a roller structure for engaging the conveyor track, a driven member responsive to the power source, and a hitch mechanism for connecting each tilting conveyor cart to an adjacent conveyor cart; (ii) a carrying tray for holding the objects; and (iii) a tiltable support apparatus for supporting the carrying tray above the trailer frame base and for allowing tilting of the carrying tray towards at least one side of the conveyor to unload objects into unloading stations on at least one side of the conveyor, the tiltable support apparatus including: (i) an upper support structure joined to the carrying tray, (ii) a lower support structure joined to the trailer frame base, and (iii) a pivot structure connecting the upper support structure to the lower support structure along a pivot axis; and (e) a tilting mechanism for tilting the carrying tray on the tiltable support apparatus to thereby unload objects into one of the unloading stations adjacent the conveyor, wherein the tilting mechanism includes: (i) a pair of actuating arms attached to the carrying tray on opposite sides of the tiltable support apparatus; and (ii) a pull-down mechanism associated with each unloading station for selectively pulling down one of the actuating arms so as to pull one side of the carrying tray downwardly and rearwardly into a tilted position; wherein each of the actuator arms includes a roller wheel on a lower end of the actuator arm, and wherein the pull-down mechanism includes a descending ramp adjacent the conveyor track, a laterally pivoting switch for directing the roller wheel of a selected actuator arm into the descending ramp and a bi-directional, rotary actuator assembly connected to the laterally pivoting switch, the rotary actuator assembly including: (i) an actuator arm having a first end and a second end, the pivot switch being connected to the first end of the actuator arm; and (ii) a bi-directional actuator attached to the actuator arm second end, whereby the rotary actuator assembly is operable to rotate the laterally pivoting switch to engage the roller wheel and direct the roller wheel of a selected actuator arm into the descending ramp and for closing the laterally pivoting switch after capture of the roller wheel.

These and other aspects of the present invention will become apparent to those skilled in the art after a reading of the following description of the preferred embodiment when considered with the drawings.

BRIEF DESCRIPTION OF THE DRAWINGS

FIG. 3 depicts a train of trailer frame structures of the conveyor carts, as seen from the top, but with the tiltable support apparatuses and the carrying trays of the conveyor carts removed for clarity;

FIG. 4 is an elevational side view of one of the tilting conveyor carts of the present invention;

FIG. 5A is a geometric depiction of the conveyor cart pivot axis and conveyor line of travel as they relate to three-dimensional X,Y,Z spatial coordinates;

FIG. 6 is a top view of the train of carts of the package sorting conveyor of the present invention;

FIG. 6A shows the train of carts of FIG. 6, but with one of the carts in its tilted position and unloading a package onto an unloading station beside the sorting conveyor track;

FIG. 7A shows the tilting conveyor cart of FIG. 7 in its tilted position;

FIG. 8A is a side elevational view of the pull-down mechanism of the invention with its switch in an open position as it captures a passing roller wheel on a conveyor cart actuating arm;

FIG. 8B is another side view of the pull-down mechanism, except with the roller wheel traveling through the descending ramp and the switch in its closed position;

FIG. 9 is a top view of the pull-down mechanism with the switch in its open position, capturing a passing roller wheel;

FIG. 9A is another top view of the pull-down mechanism, except with the roller wheel traveling through the descending ramp and the switch in its closed position;

FIG. 10 is a top view of the push-up mechanism;

FIG. 10A is a side view of the push-up mechanism;

DESCRIPTION OF THE PREFERRED EMBODIMENTS

Figure 1:
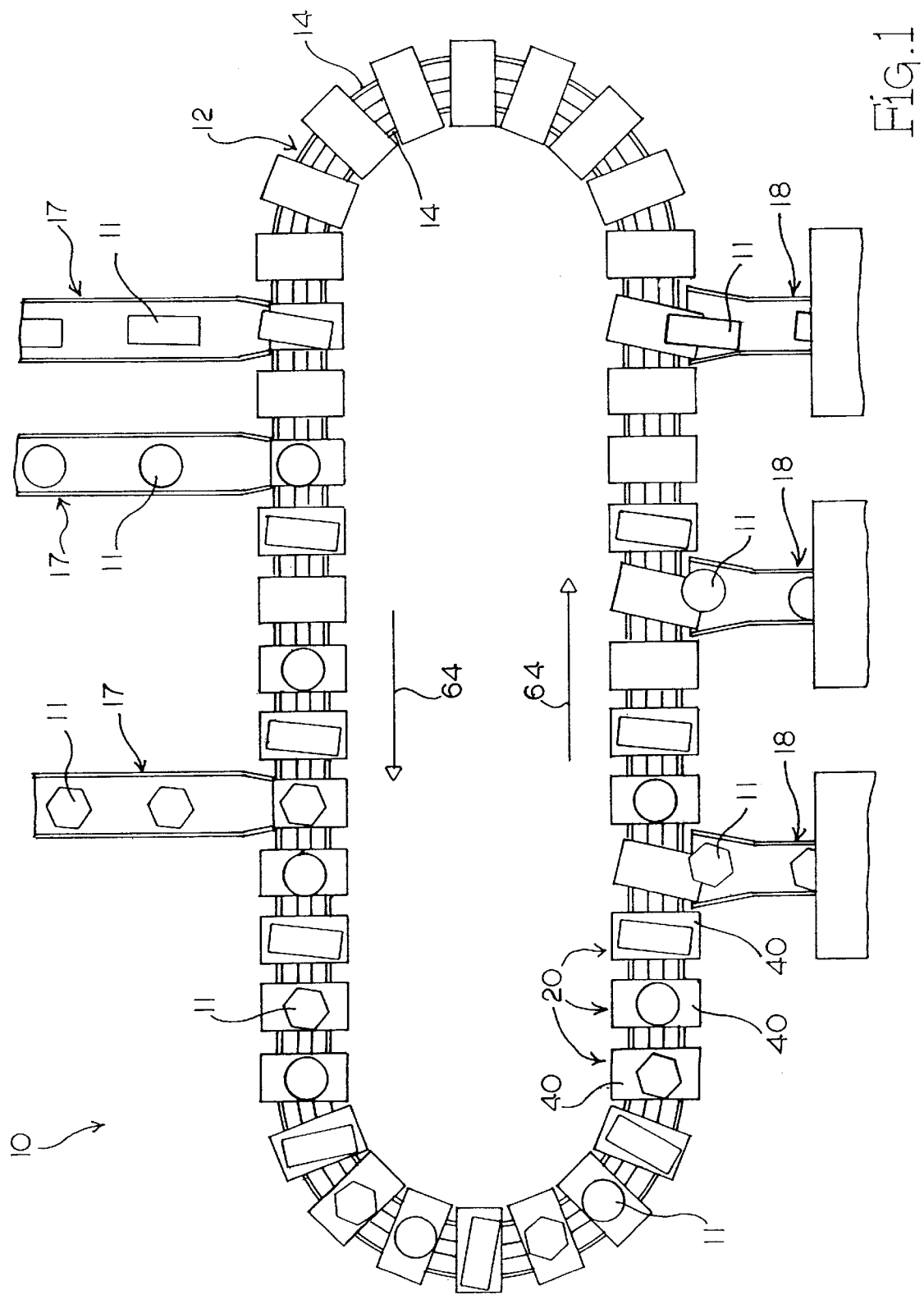
FIG. 1 is a schematic depiction of a package sorting conveyor constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As seen in FIG. 1, a sorting conveyor, generally designated 10, is shown constructed according to the present invention for transporting and sorting packages 11 or other objects. The sorting conveyor 10 comprises a train of individual carts 20, connected end to end, which preferably form an endless loop around a closed-circuit conveyor track 12. Alternately, the conveyor carts 20 of the invention could be used singly or as part of a finite train.

The package sorting conveyor 10 generally includes four major sub-assemblies: a conveyor track 12; a power source 70; the train of tilting conveyor carts 20, which are moved along the conveyor track 12 by the power source 70; and a tilting mechanism 80 for tilting the conveyor carts 20 to discharge packages 11 therefrom. Typically, any number of unloading stations or outfeed chutes 18, which are adjacent the package sorting conveyor 10 on one or both sides thereof, receive the packages 11 discharged from the sorting conveyor 10 and carry the packages to waiting storage bins, trucks, etc. Packages may be manually placed on the conveyor carts 20 or may be delivered to the sorting conveyor 10 via infeed chutes 17 or the like.

The conveyor track 12 includes two parallel rails 14 and may be built to conform to the layout of any warehouse, shipping center, distribution center, or the like. Best seen as resembling the track of a roller coaster, the conveyor track 12 may be substantially horizontal or may ascend and descend. The conveyor track rails 14 may lie in the same horizontal plane, or one may be higher than the other, such as would be the case in a banked curve in the track 12. Banked curves are greatly advantageous because they allow the conveyor carts 20 to move around a curved conveyor track 12 at a much greater speed without spilling packages 11 than on a flat track. Preferably, the rails 14 are generally tubular, again similar to a roller coaster, and are supported by rail support members 16 only on the outwardly facing edges of the rails. The rails 14 may be round or rectangular in cross-section. Rectangular cross-section is preferred since it has been found that round rails cause the roller wheels to wear somewhat in their center because the load is not as well distributed as when rectangular rails are utilized.

Figure 2:
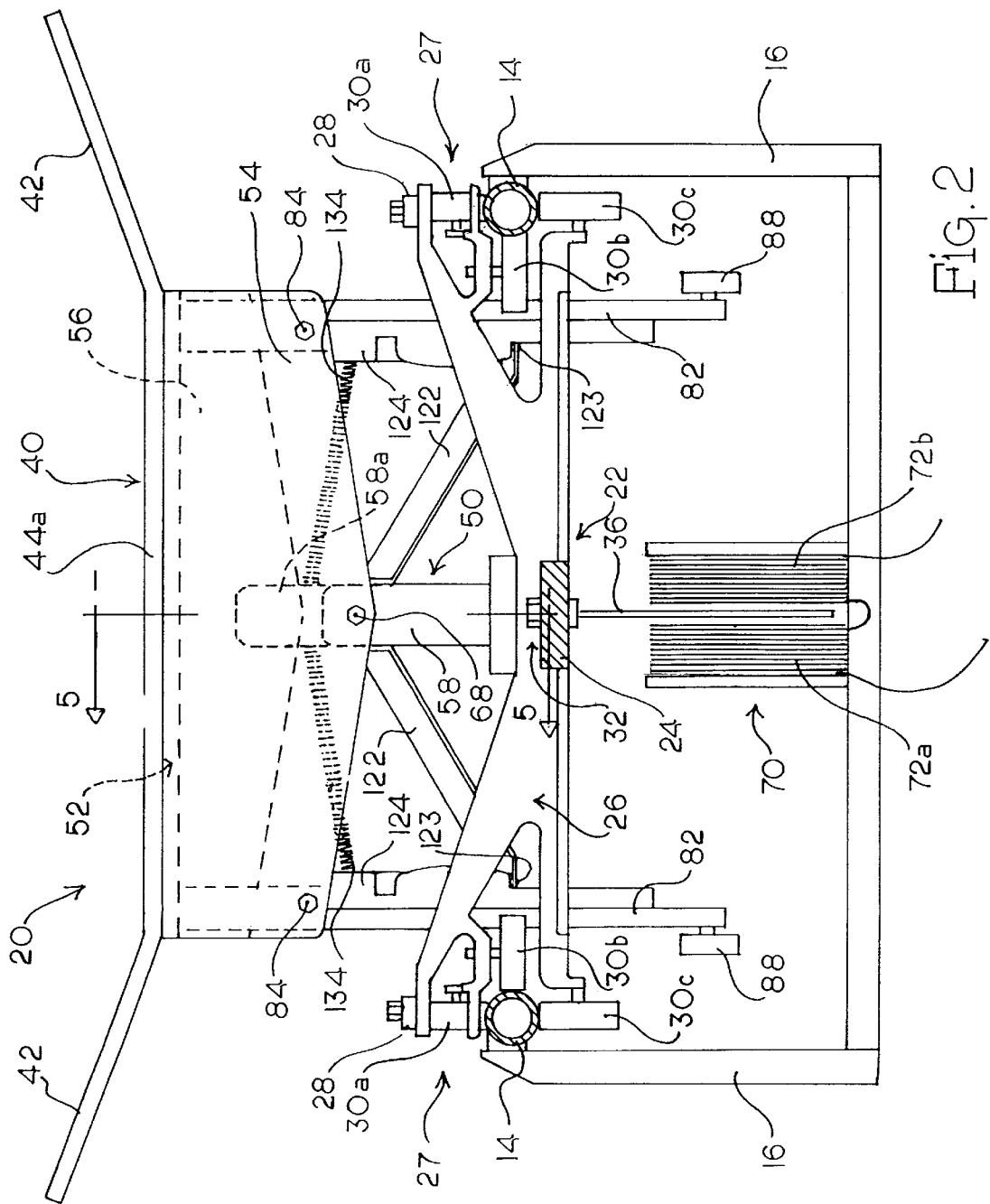
FIG. 2 is front, elevational view of a single tilting conveyor cart of the package sorting conveyor and the power source of the conveyor.

The power source 70 of the sorter conveyor 10, which is shown in FIG. 2, is preferably a vertically oriented linear induction motor (LIM). The vertically oriented LIM 70 of the present invention is an improvement over previously designed LIM's, which typically are horizontally disposed below the conveyor track. Conventional LIM's also usually depend on the presence of a heavy steel plate in each conveyor cart to provide a pathway through which electromagnetic flux from the electromagnetic coil of the LIM passes, thereby driving the carts along the track. This causes two problems. The first problem is with excessive weight of the conveyor cart train resulting from the presence of the steel plates.

The second problem is with maintaining the proper and constant distance between the electromagnetic coil of the LIM and the conveyor cart, because gravity coupled with magnetic attraction constantly try to pull the conveyor cart downwardly towards the electromagnetic coil. Magnetic attraction, which attracts the cart towards the electromagnetic coil, accounts for approximately ten percent of the force generated by the electromagnetic coil. Longitudinal thrust, which drives the conveyor cart train around the conveyor track, accounts for approximately ninety percent of the force generated by the electromagnetic coil. While the ten percent magnetic attractive force is relatively weak compared to the ninety percent longitudinal thrust force, it is still enough to pull the conveyor cart into contact with the electromagnetic coil, especially when assisted by gravity in a configuration where the LIM is horizontally disposed below the conveyor track. If the conveyor cart is drawn into contact with the electromagnetic coil, the carts are frozen in place because even the ninety percent longitudinal thrust component of the LIM's total force cannot overcome the friction created by the contacting surfaces magnetically held together. This contact and resulting conveyor failure is normally prevented by maintaining a distance between the conveyor cart and the electromagnetic coil with whatever apparatus is used to support the train of conveyor carts moveably on the conveyor track. However, as parts such as wheels wear, the distance between the conveyor carts and the electromagnetic coil is reduced until contact and resulting conveyor cart seizure is likely to occur.

The LIM 70 of the present invention solves both of these problems in two different ways. First, the conventional steel flux plate is replaced with a second electromagnetic coil 72b, which is preferably identical to, but out-of-phase with, a first electromagnetic coil 72a. Each electromagnetic coil thus performs the function of the steel plate for the other electromagnetic coil, i.e. electromagnetic coil 72a provides a flux path for electromagnetic coil 72b and vice versa. Elimination of the conventional steel plate reduces the weight of and, accordingly, the energy required to move the train of conveyor carts 20.

Second, the LIM 70 is vertically oriented so that a driven fin 36, which is attached to the bottom of each conveyor cart 20, hangs between the two electromagnets 72a,b. Composed of aluminum or other conductive metal, the vertical fin 36 preferably has swept-back front 36a and rear 36b edges, as shown in FIG. 4, giving the fin 36 a generally parallelogram shape to reduce damage in the event the fin would contact a structure and to distribute the air gap over the length of the LIM to reduce heat and maintain more constant thrust. Vertically orienting the fin 36 and the LIM 70 greatly reduces problems with maintaining proper spacing between the fin 36 and the electromagnets 72a,b, because gravity ceases to be a factor as the weight of the live load varies and because the two electromagnets 72a,b, of the LIM 70 both attract the fin 36 equally. This results in the fin 36 being easily maintained equidistant between the two electromagnets 72a,b of the LIM 70 of the invention, thereby preventing the fin 36 from contacting one of the electromagnets and being seized in place as described above.

The electromagnets 72a,b are out-of-phase with respect to each other so that the inductive force they create will flow in the same direction. In other words, the electromagnets 72a,b are electrically out-of-phase while physically opposed to each other so as to supplement each other's inductive forces on the fin 36, instead of canceling each other out. This helps provide a consistent motive force on the train of conveyor carts because longitudinal thrust remains substantially constant even if the fin 36 is pulled slightly closer to one of the electromagnets 72a,b of the LIM 70. While the longitudinal thrust is thereby increased with respect to the closer electromagnet, the longitudinal thrust with respect to the more distant electromagnet is proportionally decreased. Thus, total longitudinal thrust in the direction or line of travel remains constant even if the fin 36 wavers slightly from side to side. While a small degree of lateral fin movement may occur, the structure of the carts and the opposing pull of the electromagnets 72a,b prevent any change in the total thrust if the fin is pulled into close proximity with either electromagnet. The LIM 70 ordinarily moves the train of conveyor carts 20 in one direction of travel; however, it can also be reversed if necessary to run the sorting conveyor backwards.

Now turning to the train of tilting conveyor carts 20, each cart 20 includes three major sub-assemblies, shown best in FIG. 2: a trailer frame structure 22, a generally horizontally disposed carrying tray 40 for holding the packages 11, and a tiltable support apparatus 50 for supporting the carrying tray 40 above the trailer frame structure 22 and for allowing tilting of the carrying tray 40 towards either side of the sorting conveyor 10 to unload a package into one of the unloading stations. Each cart 20 is built around a base trailer frame structure 22 to which other components of each cart 20 are mounted. As shown in FIG. 3, the trailer frame structure 22 includes a longitudinal base member 24 that extends in the rearward direction of conveyor travel 64 between the two parallel rails 14. Preferably, the base member 24 is substantially equidistant from each rail 14.

A roller structure 26 for riding on the conveyor track 12 is mounted on a front end of the base member 24 and includes two laterally extending roller wheel mechanisms 27, one for each rail 14. The reason for the outboard placement of the rail supports 16 and the tubular shape of the rails 14 becomes apparent upon examining the roller wheel mechanisms 27. Each roller wheel mechanism 27 includes three roller wheels: an upper roller wheel 30a for riding on the top edge of the rail 14, a middle roller wheel 30b for riding on an inside edge of the rail 14, and a lower roller wheel 30c for riding on the bottom edge of the rail 14. With this configuration, it is almost impossible for a cart 20 to jump the track 12, because a wheel is provided for each directional force (sideways, upward, and downward) that a cart 20 may encounter when traveling along the track 12. Preferably, each roller wheel 30a,b,c is constructed of a somewhat resilient material such as polyurethane to provide for smooth, quiet, relatively vibration-free operation of the sorter conveyor 10.

Figure 3A:
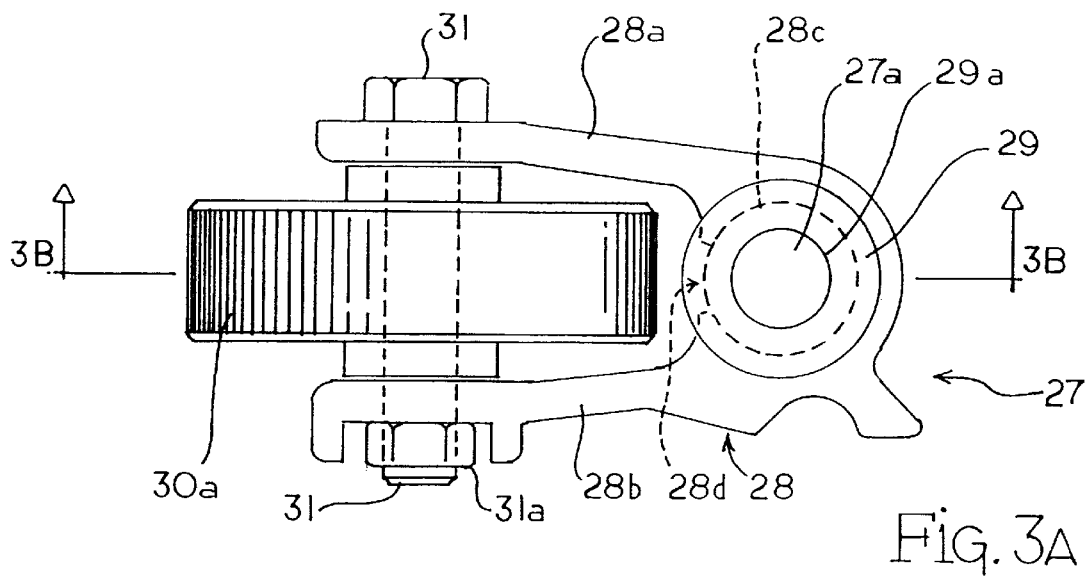
FIG. 3A depicts a top view of an axle caster that holds a roller wheel on one of the conveyor carts.
Figure 3B:
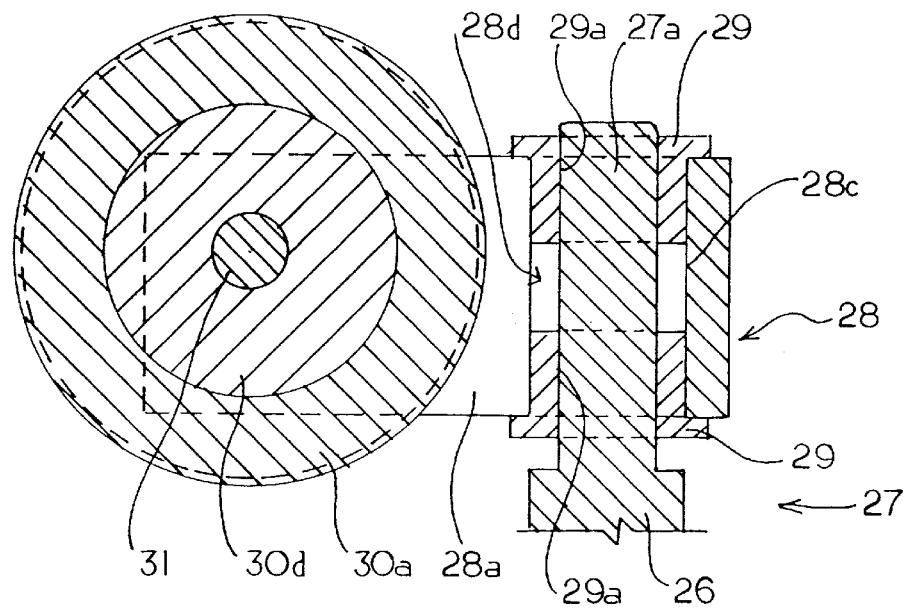
FIG. 3B is a cross-sectional view of the axle caster and roller wheel of FIG. 3A, taken along lines 3B—3B.

Referring now especially to FIGS. 3A and 3B, the structure of each roller wheel mechanism 27 that holds the top wheel 30a is shown in greater detail. Each top roller wheel 30a is retained by an axle caster 28 that is preferably formed from extruded aluminum or the like. The axle caster 28 includes two forks 28a and 28b, one on each side of the wheel 30a, and a bearing bore 28c disposed at the juncture of the two forks 28a,b, which has an opening 28d on one side so that the bearing bore 28c communicates with the space between the forks 28a,b. A pair of flange bearings 29 seated in the bearing bore 28c are disposed around an axle shaft 27a extending from the roller structure 26. Preferably formed of "oilite" or other friction-reducing material, each flange bearing 29 has the form of a top-hat bushing and includes a center hole 29a through which passes the axle shaft 27a. The roller wheel 30a is held in place between the two forks 28a,b by a bolt 31 and nut 31a. Preferably, the roller wheel 30a includes a bearing structure 30d disposed around the bolt 31, which serves as an axle running through the center of the wheel 30a.

The axle caster shown in FIGS. 3A and 3B represents an improvement over existing axle casters that hold roller wheels. Due to wear, axle casters inevitably tend to become loose and allow the roller wheels to chatter back and forth, which would inhibit smooth, quiet, vibration-free operation of a sorting conveyor. However, previously designed axle casters typically have a bearing around the axle shaft that must be pressed out when worn and replaced with a new bearing that must be pressed in. This requires a press in addition to more time and expense than is desirable in a large sorting conveyor system.

The axle caster 28 of the present invention solves this problem by providing that the flange bearings 29 can easily be slid into place by hand into the bearing bore 28c without using a press. Then, to immovably secure the flange bearings 29 inside the bearing bore 28c, the forks 28a,b are slightly flexed inwardly towards each other as the nut 31a is tightened onto the bolt 31 to hold the wheel 30a in place. The forks 28a,b of the axle caster 28 are therefore formed minutely wider apart than would be necessary to merely hold the wheel 30a. When the forks 28a,b are flexed inwardly towards each other by tightening the nut 31a on the bolt 31, the opening 28d of the bearing bore 28c is closed somewhat and the bearing bore 28c is itself slightly distorted, securely retaining the flange bearings 29 therein. The flange bearings 29 themselves are, however, not significantly distorted and are free to swivel back and forth on the axle shaft 27a. Therefore, the flange bearings 29 can easily and immediately be replaced on-site when worn, eliminating much down-time that would be required if conventionally designed axle casters were used in the conveyor cart 20 of the present invention.

Adjacent carts 20 in the train are connected together using hitch mechanisms 32. Each hitch mechanism 32 is shown in FIGS. 3 and 4 as including a front hitch 32a mounted on the front end of the base member 24 in front of the roller structure 26 and a rear hitch 32b mounted on the rear end of the base member. In the embodiment disclosed, each hitch 32a,b has a vertical throughbore, through which a hitch pin connector 32c is inserted. Preferably, the hitch mechanisms 32 are configured so that the front hitch 32a on a rearward cart is disposed overtop of the rear hitch 32b on a forward cart. In the alternative, the hitch mechanisms 32 may comprise a poly-directional spherical ball joint mechanism similar in structure to an automotive trailer hitch. In either case, friction between hitch mechanism components is preferably reduced by, for example, lining the hitch components with TEFLON or other relatively friction-free material.

To prevent adjacent conveyor carts 20 from separating should the hitch mechanism 32 accidentally break or become uncoupled, an auxiliary cart connector 34 is preferably connected between the trailer frame structures 22 of adjacent carts 20. In the preferred embodiment, the auxiliary cart connector 34 is a metal cable or lanyard, although other high-tensile strength materials could be used. In the embodiment depicted, the auxiliary cart connector 34 is an approximately 3/16th inch thick metal cable connected to adjacent trailer frame structures 22 with metal mounting connectors 34a.

The primary reason that metal is the preferred material for the auxiliary cart connector 34, besides its strength, is so that the auxiliary cart connector 34 will also serve as a continuous electrical connector between adjacent carts 20. Electrical continuity between carts 20 is important because of static electricity build-up while the carts 20 are traveling around the conveyor track 12. However, because the roller wheels 30a,b,c are preferably formed of polyurethane (an electrical insulator) and because the components of the hitch mechanism 32 are preferably coated with TEFLON (also an electrical insulator), electrical continuity between adjacent carts 20 would not otherwise be effectively achieved. By electrically connecting the carts 20, static charges can be bled off from the train, which is important for safety and operational considerations. Thus, the auxiliary cart connector 34 serves two important purposes: first, it physically attaches two adjacent conveyor carts 20 and prevents them from becoming completely separated should the hitch mechanism 32 fail; second, it enables electrical continuity among all of the conveyor carts 20 in the train.

The configuration of the conveyor cart 20 of the present invention, with its forwardly mounted roller structure 26, particularly structured hitch mechanism 32, and swept-back fin 36 is a significant improvement over previously designed conveyor carts. In conventional conveyor carts, the roller structures are typically mounted at the rear end of the trailer frame and the rear hitch is disposed overtop of the forward hitch. When a hitch mechanism breaks or becomes accidentally uncoupled with this old configuration, the result is that the forward end of the trailer frame drops below the conveyor track and is pushed over underlying structures or the floor. As this uncoupled cart contacts the surrounding permanent structures, the force exerted by the mass and acceleration of the carts leads to inevitable damage to the sorter carts, the conveyor track, and the surrounding structure. This occurrence is similar to a railroad train becoming derailed from the tracks causing massive damage to the individual carts, the railroad track, and any surrounding structure that the train contacts.

With the present design, even without the auxiliary connector cable 34, only the rear end of the trailer frame structure 22 will drop below the conveyor track 12 upon accidental disengagement of the hitches 32a,b or upon breakage of the hitch mechanism 32. Therefore, instead of the front end 36a of the driven fin 36 digging into the floor or underlying structures below the conveyor, as is the case with prior art conveyors, the driven fin 36 will simply be dragged with relatively minimal damage should one of the hitches 32 break or become accidentally uncoupled. If an auxiliary connector cable 34 is attached between two adjacent carts 20 that break apart, the connector cable 34 will limit the distance that the rear end of the trailer frame structure 22 will drop, further limiting damage.

Mounted atop the trailer frame structure 22 of each conveyor cart 20 is the tiltable support apparatus 50, which supports the carrying tray 40 thereabove. As can best be seen in FIG. 5, the tiltable support apparatus 50 generally includes three components: an upper support structure 52 joined to a bottom surface of the carrying tray 40, a lower support structure 58 centrally mounted atop the longitudinal base member 24, and an angled pivot structure 60 pivotally connecting the lower support structure 58 to the upper support structure 52 along a pivot axis 62.

In turn, the upper support structure 52 includes a front support member 54 and a back support member 56. The lower support structure 58 is preferably generally planar, lying in the vertical plane parallel to the conveyor line of travel 64, and includes an angled upper edge 58a. The pivot structure 60 preferably includes an axle 68 that runs either through or along the upper edge 58a of the lower support structure 58 and is connected to the front and back support members, 56, 58, respectively. Preferably, the axle 68 runs through lower regions of the front and back support members 56, 58. As can be seen, the front support member 54 depends farther down from the carrying tray 40 than the back support member 56 While the lower support structure 58 is stationarily fixed to the trailer frame 22, the axle 68 allows the upper support structure 52 to pivot along the pivot axis 62 of the pivot structure 60.

In an alternate embodiment of the tiltable support apparatus (not shown), the upper support structure 52 could also comprise, like the lower support structure 58, a generally planar member that lies in the vertical plane parallel to the conveyor line of travel 64. In this case, the angled pivot structure 60 could take on the form of a hinge structure joining together the two generally planar support structures 52, 58.

Figure 5:
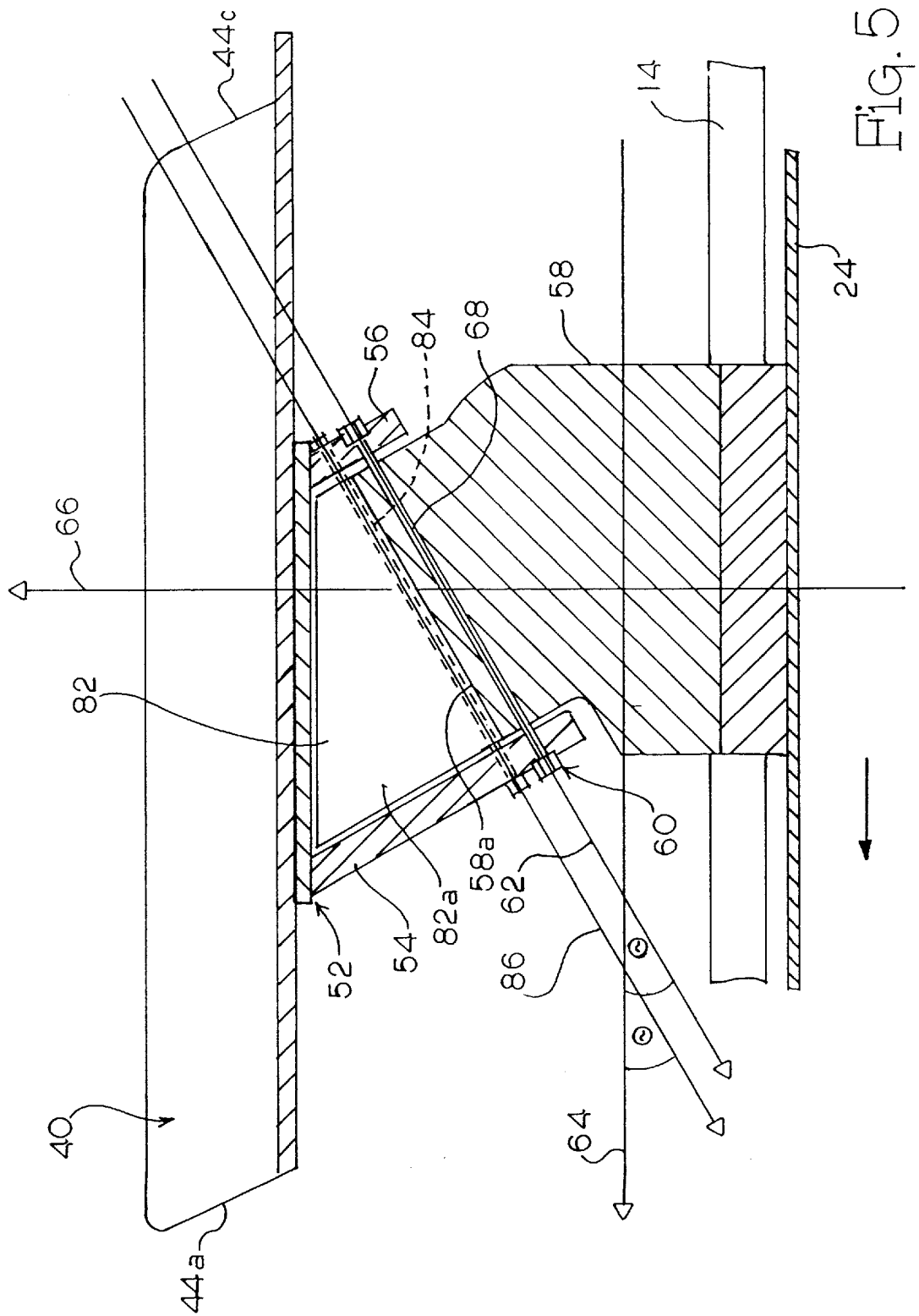
FIG. 5 is a sectional side view of a tilting conveyor cart, taken along lines 5—5 of FIG. 2, which shows the tiltable support apparatus and the angled pivot structure of the tilting conveyor cart of the invention.

The pivot axis 62 lies in a vertical plane parallel to the conveyor line of travel, which is shown in the drawings as horizontal line 64. However, unlike conventional sorter conveyor tilting carts, the pivot axis 62 of the conveyor cart 20 of the invention is disposed at an angle θ to the conveyor line of travel 64 so as to impart two axial components to the tilting of the carrying tray 40. Preferably, the pivot axis 62 is angled downwardly at an angle of approximately 20 to 45 degrees below horizontal in a forward direction. In the embodiment disclosed, the pivot axis 62 is angled downwardly 30 degrees. As can be seen in FIG. 5, the pivot axis 62 preferably intersects a plane occupied by the carrying tray 40 rearward of the center of the tray 40.

By disposing the pivot axis 62 at a downwardly directed angle θ instead of parallel to the conveyor line of travel 64, two axial components are imparted to the tilting motion of the carrying tray 40. The first axial component of the tray's tilting motion is lateral tipping on a horizontal axis parallel to the conveyor line of travel 64. The second axial component of the tray's tilting motion is rotating around a vertical axis 66 perpendicular to the conveyor line of travel. Thus, while the tray only tilts along a single, angled pivot axis 62, the overall motion of the tray 40 as it tilts includes two axial components.

The tilting motion of the tray may also be described using three-dimensional X, Y, and Z-axis spatial coordinates, as shown in FIG. 5A, wherein the Y-axis is parallel to the conveyor line of travel 64, the X-axis extends horizontally perpendicular to the line of travel 64, and the Z-axis extends vertically perpendicular to the line of travel 64. In the present invention, tilting of the tray 40 includes a Y-axis and a Z-axis component, for as shown in FIG. 5A the pivot axis 62 intersects the Y and Z axes. Specifically and for illustrative purposes only, using the preferred 37.5 degree downward angle θ of the pivot axis 62, it can be appreciated that the ratio of Y-axis motion to Z-axis motion is 60:30. In other words, with a 30 degree angle θ, the tray 40 laterally tips somewhat farther than it rotates. If the angle θ of the pivot axis 62 is increased to 45 degrees below horizontal, then the tray will tilt and rotate equally.

As shown in FIGS. 6 and 6A, one effect of this two-axis tilting of the carrying tray 40 is that a side 44*b* of the tray that is tilted downwardly also rotates rearwardly relative to the cart 20, as shown in FIG. 6A by line 46*a*. Side 44*d* of the tray, which is tilted upwardly, rotates forwardly relative to the cart 20, as shown in FIG. 6A by line 46*b*. In the preferred embodiment, in which the pivot axis 62 intersects the plane occupied by the tray 40 rear-of-center, the front side 44*a* of the tray 40 rotates a greater distance around the vertical axis 66 than the back side 44*c* of the tray 40, upon tilting of the tray 40. As shown in FIG. 6A, the bisecting center line of the tray 40 rotates farther at its forward end from the horizontal line of travel 64 than at its rearward end. Thus, front side rotation line 48*a* follows a longer arc than back side rotation line 48*b*. By rearwardly rotating whichever side of the tray 40 is being tilted downwardly, some rearward velocity is imparted to packages 11 as they are being discharged from the cart 20 of the invention into an unloading station 18. Thus, packages are discharged at a lower velocity relative to the unloading station than the velocity of the train of conveyor carts as a whole. This enables the packages to be discharged into a narrower chute than could be accomplished using a conventional conveyor cart. Additionally, because the packages are slowed down somewhat as they are discharged, there is less potential for damage to occur.

As can be seen in the drawings, the tray 40 may also include upwardly angled lateral wings 42 to help prevent packages 11 from accidentally falling off the tray 40. These wings 42 also decrease the angle of the slope created when the tray 40 is tilted, which helps with gentle handling of the packages 11 as they are discharged from the cart 20.

When a carrying tray 40 reaches a particular destination unloading station 18, the tilting mechanism 80 tilts the carrying tray 40 to cause a package 11 carried thereon to be discharged into the unloading station 18. The tilting mechanism 80 generally includes components mounted on each conveyor cart 20 and components associated with each unloading station 18. First is a pair of actuating arms 82 attached beneath each cart's carrying tray 40 on opposite lateral sides thereof, one actuating arm 82 on each side of the cart's tiltable support apparatus 50. Second is a pull-down mechanism 90 immediately upstream from each unloading station 18. The pull-down mechanism 90, when activated, selectively pulls down one of the actuating arms 82 and thereby pulls the respective side of the tray 40 downwardly and rearwardly into the biaxially tilted position described above. Third is a push-up mechanism 110 downstream of the unloading station 18, which pushes up the actuating arm 82 pulled down by the pull-down mechanism 90 and thereby reorients the tray 40 into its normal, upright position. Fourth is a locking structure 120, which locks the carrying tray 40 in the tilted position upon pulling down of one of the actuating arms 82, and which also locks the carrying tray 40 in its normal, upright position upon pushing up of that actuating arm 82.

Figure 7:
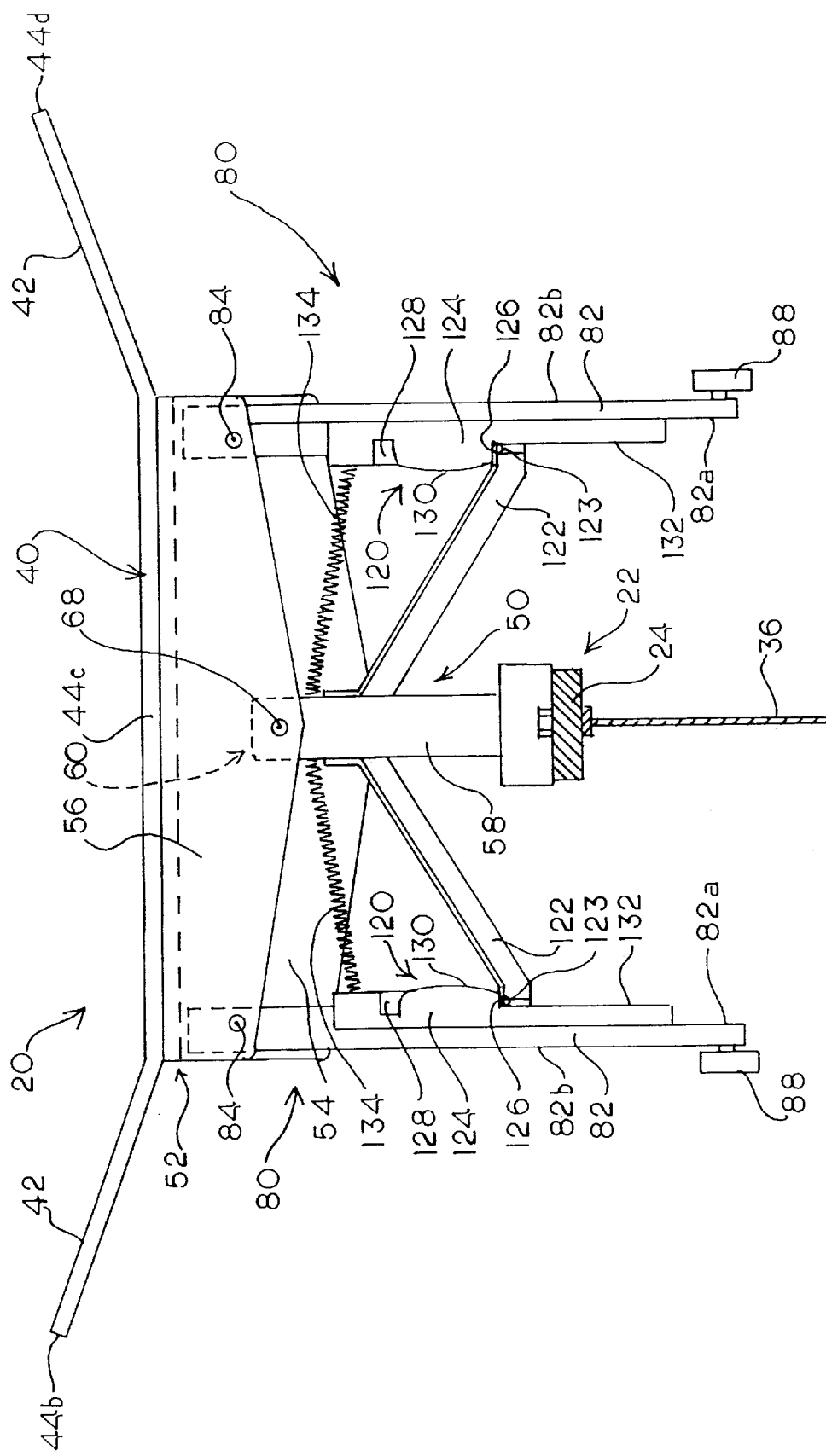
FIG. 7 is a rear view of the tilting conveyor cart taken along lines 7—7 of FIG. 4 with the track rails and the roller structure omitted for clarity, which shows the conveyor cart in its upright, horizontal position.

Referring now to FIGS. 7 and 7A, each actuating arm 82 is pivotally attached to the underside of one side of the carrying tray and is preferably connected to the front and back support members, 54 and 56 respectively, of the upper support structure 52. In the embodiment shown, the actuating arm 82 is attached to the front and back support members by an angled pivot hinge axle 84 that runs through both support members 54, 56 and through the upper end of the actuating arm 82. The actuating arm 82 therefore pivots on a pivot axis 86 that is preferably parallel to the pivot axis 62 of the tiltable support apparatus 50, as shown in FIG. 5. As can be seen from an examination of the drawings, the actuating arms 82 and their respective pivot axes 86 remain substantially in a vertical plane parallel to the conveyor line of travel 64 when stationary and when being pulled down or pushed up.

Each actuating arm 82 also includes a roller wheel 88, which engages the pull-down and push-up mechanisms 90, 110, as will be described below. The roller wheel 88 is preferably mounted on the lower end of the actuating arm 82 on an outer surface 82*a* thereof. It is conceivable, however, that the roller wheel 88 could be replaced with a friction reducing slide block or other protrusion for engagement by the pull-down and push-up mechanisms 90, 110.

Seen in detail in FIGS. 8, 8A, 9, and 9A, a pull-down mechanism 90 is associated with each unloading station 18 and is located beneath the rail 14 running closest to the unloading station 18 on the upstream side thereof, as indicated in FIG. 6A. The pull-down mechanism 90 includes a descending ramp 92 and a laterally pivoting switch 94 that, when actuated, pivots open and directs the roller wheel 88 of a passing actuating arm 82 into the descending ramp 92. As can be seen in the drawings, when the switch 94 is not actuated, the switch is in a closed position parallel to the ramp 92, and the roller wheel 88 is free to bypass the switch and the descending ramp 92. However, when a particular package 11 arrives at its destination unloading station 18, the switch 94 is automatically actuated so that it pivots open into the path of the passing roller wheel 88, capturing the roller wheel 88. The roller wheel 88 then rolls through the switch 94, causing the actuating arm 82 to pivot outwardly somewhat, and into the descending ramp 92. As the roller wheel 88 rolls through the switch 94, the roller wheel 88 engages a closure flange 104 and enters the descending ramp 92. Next, the descending ramp 92 forces the roller wheel 88 and the associated actuating arm 82 downwardly so as to pull down one side of the tray 40, thereby discharging the package from the tray 40 into the unloading station 18 adjacent the pull-down mechanism 90.

A computer controller (not shown) is used to track all packages 11 moving on the conveyor 10 and to automatically actuate a switch 94 at the appropriate time when a particular package 11 reaches its destination unloading station or outfeed chute 18. The computer is also connected to the LIM 70 to control the movement of the conveyor train and maintain a desirable rate of speed.

Figure 11:
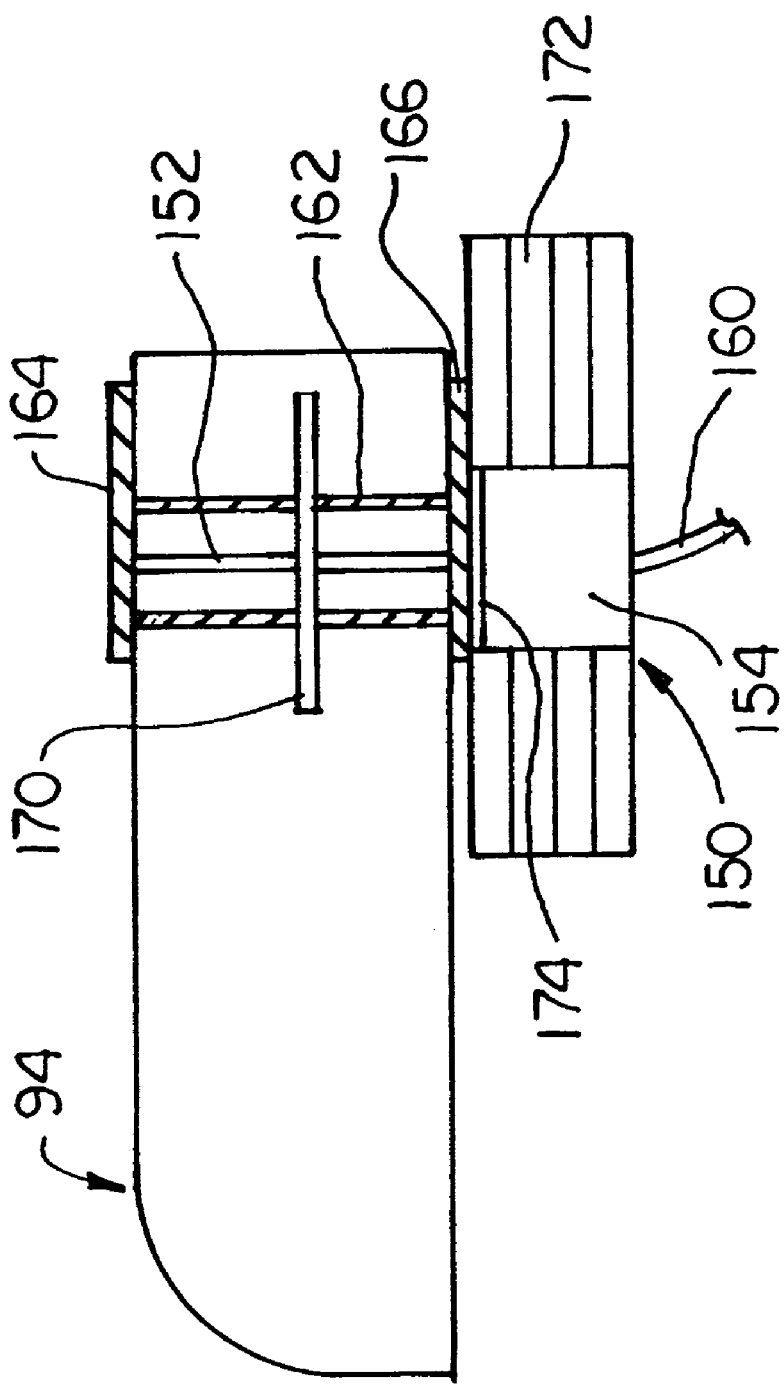
FIG. 11 is a cross sectional view showing the bidirectional actuator connected to the pivot switch.

The pivot switch 94 is attached to a bidirectional actuator 150 as shown in FIGS. 8 and 8A. The bidirectional actuator is mounted below the pivot switch 94 away from the moving roller wheels. As shown in FIG. 11, the bidirectional actuator 150 includes a coaxial arm 152 extending from an actuator motor 154 and connected to the interior of the pivot switch 94.

The actuator motor 154 rotates the coaxial arm 152 and the attached pivot switch 94 between the open position to capture the roller wheel 88 and the closed position to allow the roller wheel to bypass the unloading station. Power and communication means with the conveyor system is supplied to the actuator motor 154 via a cord 160. To rotate the coaxial arm to an open position, power is continuously applied to the motor to maintain the pivot switch in the open position. When power is turned off, a coil spring positioned inside the actuator motor 154 biases the arm causing the pivot switch to rotate to the closed position. This combination of powered on and powered off enables the pivot switch to be controlled independently of the movement of the roller wheels. In one embodiment, the actuator motor is a 500 Model 40R10102-10-11 rotary solenoid actuators ("the model 40R actuators") from Ram Manufacturing Company, Inc. The actuator motor 154 is mounted within a heat sink 172.

As seen in FIG. 11, an outer clevis 162 surrounds the actuator arm 152 and is mounted between an upper bracket 164 and a lower bracket 166. The outer clevis 162 is mounted to a lower body 174 that is aligned substantially perpendicular to align with the lower bracket 166. Connector means such as screw or bolts mount extend through the lower bracket 166 and lower body 174 to secure the bidirectional actuator to the tipping mechanism. The outer clevis 162 is sized larger than the actuator arm 152 such that as the arm rotates, the clevis maintains a fixed position. A roll pin 170 extends through the actuator arm 152 and outer clevis 162 and into the interior of the pivot switch 94. The roll pin 170 is fixedly attached to the actuator arm 152 such that the rotation of the actuator arm moves the pin which thereby moves the pivot switch through the open and closed positions. The roll pin extends through apertures within the outer clevis such that the pin has a free range of movement.

The outer clevis 162 and upper bracket 164 and lower bracket 166 protect the actuator arm 152 from stresses applied to the pivot switch 94. The outer clevis 162 allows for the pivot switch to pivot about the clevis, but prevents the pivot switch from moving in a linear direction which could damage the actuator arm.

In use, the actuator motor 154 is energized thereby rotating the actuator arm 152 causing the pivot switch to rotate to the open position. The next passing roller wheel will be captured by the pivot switch and diverted into the unloading station path. After the roller wheel has been captured, power to the actuator motor 152 will be stopped causing the inner coil spring to bias the pivot switch in the closed position. However, while the roller wheel is running along the length of the pivot switch, the force of the wheel will maintain the switch in the open position. Once the roller wheel has passed downstream of the pivot point, the pivot switch will rotate to a closed position by the biasing of the internal coil spring.

This arrangement provides for the pivot switch to be maintained in an open position for the shortest duration thereby allowing the speed of the sorter conveyor to be increased over previous designs without the problem of the switch inadvertently remaining open and catching the next passing roller wheel thereby starting the cascade effect. Powering down the pivot switch to the closed position will also remove inadvertent captures such as when a roller wheel is missing from the actuating arm or if the roller wheel were to jump the pivot switch without entering the unloading station. Previously available designs depended upon the roller wheels passing along the pivot switch to rotate the pivot switch to the closed position.

After the carrying tray 40 has been tilted and a package carried thereon has been discharged into an unloading station 18, the carrying tray is reoriented into its normal upright position by the push-up mechanism 110. Seen best in FIGS. 10 and 10A, a push-up mechanism 110 is associated with each unloading station 18 and is located beneath the track 12 adjacent the unloading station 18 on the downstream side thereof, as indicated in FIG. 6A. Each push-up mechanism 110 includes an ascending ramp 112 below the rail 14 adjacent the unloading station 18. The push-up mechanism 110 also includes a wedge-shaped frog 114 that engages the roller wheel 88 on a pulled-down actuating arm 82 and directs the roller wheel 88 into the ascending ramp 112. The frog 114 is positioned low enough below the track 12 so that roller wheels 88 will be engaged and directed into the ascending ramp 112 only if they have already been pulled down by the pull-down mechanism 90. As the roller wheel 88 is directed into the ascending ramp 112, the actuating arm 82 is pivoted outwardly somewhat so that the outside edge 123 of the locking flange 122 will disengage from the tilted position locking channel 127. To help pull the actuating arm 82 back into substantially vertical alignment after the locking flange 122 has slid over the slide surface 130, the top of the ascending ramp 112 includes an inwardly turned section 116.

Now turning to the locking structure 120 of the tilting mechanism 80, it can be seen best in FIGS. 7 and 7A that the locking structure 120 includes a pair of locking flanges 122, a pair of locking blocks 124 mounted one each to the actuating arms 82, and a biasing member 134 for biasing the actuating arms 82 inwardly into a locked position. Preferably, the locking flanges 122 laterally extend from both sides of the lower support structure 58 of the tiltable support apparatus 50, although they could also be mounted to the trailer frame structure 22. In the embodiment disclosed, the locking flanges 122 comprise generally planar steel plates having rollers 123 mounted to their outer edges 123. In an alternate embodiment, the rollers 123 could be eliminated and the locking blocks 124 made of a low-friction material on which the roller-less outer edges of the locking flanges 122 could easily slide.

Each locking block 124 is mounted to an inner surface 82a of the actuating arm 82 and includes two locking channels 126 and 134 separated by a cammed section 130 having a generally convex outer surface. The lower 126 of the two locking channels receives the roller 123 at the outer edge of the lateral locking flange 122 when the carrying tray 40 is in its upright position. The upper 134 of the two locking channels receives the roller 123 when the carrying tray 40 is in its tilted position. As the tray 40 is tilted from one position to the other, the roller 123 rolls over the cammed section 130 interposed between the two locking channels 126, 134. Preferably, the locking blocks 124 are made of a wear-resistant material such as plastic, although other materials could be used. The biasing member, which may be a spring 134, pulls the actuating arms 82 inwardly so as to engage the locking structure 120 by seating the locking flanges 122 in one of the locking channels 126, 134.

During tilting of the tray 40 by the pull-down mechanism 90, the actuating arm 82 being pulled down is pivoted outward slightly on the pivot axis 86 as the roller wheel 88 is captured by the switch 94 and directed into the descending ramp 92. This outward pivoting of the actuating arm 82 causes the upright position locking channel 126 to disengage from the locking flange 122. Then, as the roller wheel 88 is pulled down by the descending ramp 92, the locking flange 122 rolls upwardly over the cammed section 130. Because of the curved, convex shape of the cammed section 130 of the locking block 124, the actuating arm 82 remains substantially vertical as it is pulled down. This helps prevent the roller wheel 88 from slipping out of the descending ramp 92 of the pull-down mechanism 90. Eventually, the locking flange 122 is seated in the tilted position locking channel 134 as the wheel exits the descending ramp 92 and the tray 40 reaches its fully tilted position. The degree to which the tray 40 is tilted in the fully tilted position can vary depending on the configuration of the locking blocks 124 and the pull-down mechanism 90. However, in the embodiment disclosed, the tray 40 is tilted approximately 37.5 degrees from horizontal in the fully tilted position.

The biasing member 134 holds the tilted position locking channel 134 and the locking flange 122 together while the cart 20 is moving past the unloading station 18, stabilizing the tray 40 in the tilted position. Then, when the downwardly pulled actuating arm 82 reaches the push-up mechanism, the arm 82 is pivoted outwardly by the wedge-shaped frog 114 engaging the roller wheel 88. This outward pivoting causes the locking flange 122 to disengage from the tilted position locking channel 134. As the roller wheel 88 moves up the ascending ramp 112, the locking flange rolls downwardly over the cammed section 130. As the inwardly turned top end 116 of the ascending ramp 112 pivots the actuating arm 82 back to its vertical orientation, the locking flange 122 seats in the upright position locking channel 126, where it is held in place through the action of the biasing member 134.

The actuating arm 82 on the opposite side of the conveyor cart 20, which is not being pulled down or pushed up at a particular unloading station 18, simply rises and falls with the side of the tray 40 to which it is attached. The locking flange 122 on this side of the cart 20 simply rolls over a flat section 132 of the locking block 124 below the upright position locking channel 126.

In an alternate embodiment (not shown) of the package sorting conveyor 10 of the invention, the conveyor cart 20 could include a tiltable support apparatus having a pivot axis that is not angled downwardly but that is generally parallel to the conveyor line of travel 64. In this case, the tilting motion of the carrying tray 40 would only have a single axial component—lateral tipping on a horizontal axis parallel to the conveyor line of travel 64. While package sorting conveyors having a single-axis lateral tipping motion have been designed in the past, they do not include the other inventive features of the present sorting conveyor 10 such as the vertically oriented LIM 70, the hitch mechanism 32 and auxiliary cart connector 34, and the tilting mechanism 80 with its associated components.

Such single-axis conveyor carts would primarily be incorporated into the package sorting conveyor 10 of the present invention for use in sorting particularly large packages that must be carried by two or more adjacent carrying carts 20. In this case, the trays of the adjacent carts would be simultaneously tilted as the carts reached an unloading station to discharge the package. This would also of course require an especially wide outfeed chute as well as a pull-down mechanism adjacent the unloading station for each cart to be simultaneously tilted.

The reason that single-axis conveyor carts are especially useful for sorting large packages is that it has been found that this double (or triple, etc.) unloading of particularly large packages using the two-axis carrying carts 20 of the present invention occasionally presents difficulties due to the carrying trays 40 not being in the same spatial plane when they are both in their fully tilted positions. Therefore, for double unloading, it is preferable to use the alternate, single-axis embodiment of the conveyor cart.

Several configurations of the package sorting conveyor 10 may be employed that utilize the alternate, single-axis conveyor carts for double unloading situations. A preferable configuration would comprise two adjacent single-axis carts for carrying a single large package. A second configuration would comprise a leading two-axis conveyor cart 20 and a trailing single-axis cart. A third configuration would comprise a leading single-axis conveyor cart and a trailing two-axis conveyor cart 20. As a whole, the package sorting conveyor 10 of the invention may include both two-axis conveyor carts 20 as well as single-axis conveyor carts interspersed among each other depending on a particular facility's conveying and sorting requirements.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A sorting conveyor for transporting objects and unloading objects at one or more unloading stations adjacent the conveyor, said sorting conveyor comprising:
   (a) a conveyor track;
   (b) a train of tilting conveyor carts connected end-to-end;
   (c) a power source for moving said conveyor carts on said conveyor track;
   (d) each of said tilting conveyor carts comprising: (i) a trailer frame base, including: a roller structure for engaging said conveyor track, a driven member responsive to said power source, and a hitch mechanism for connecting each tilting conveyor cart to an adjacent conveyor cart; (ii) a carrying tray for holding the objects; and (iii) a tiltable support apparatus for supporting said carrying tray above said trailer frame base and for allowing tilting of said carrying tray towards at least one side of the conveyor to unload objects into unloading stations on at least one side of the conveyor; and
   (e) a tilting mechanism for tilting said carrying tray on said tiltable support apparatus to thereby unload objects into one of the unloading stations adjacent the conveyor, wherein said tilting mechanism includes: (i) a pair of actuating arms attached to said carrying tray on opposite sides of said tiltable support apparatus; and (ii) a pull-down mechanism associated with each unloading station for selectively pulling down one of said actuating arms so as to pull one side of said carrying tray into a tilted position; wherein each of said actuator arms includes a roller wheel on a lower end of said actuator arm, and wherein said pull-down mechanism includes a descending ramp adjacent said conveyor track, a laterally pivoting switch for directing the roller wheel of a selected actuator arm into said descending ramp and a bi-directional, rotary actuator connected to said laterally pivoting switch for opening said laterally pivoting switch so as to capture a selected roller wheel and direct the roller wheel into the descending ramp and for closing said laterally pivoting switch after capture of the roller wheel.

2. The apparatus according to claim 1, wherein said tilting mechanism further comprises a locking structure for locking said carrying tray in the tilted position upon pulling down of one of said actuating arms, and for locking said carrying tray in the upright position upon pushing up of said actuating arm and wherein said tiltable support apparatus includes: (i) an upper support structure joined to said carrying tray, (ii) a lower support structure joined to said trailer fame base, and (iii) a pivot structure connecting the upper seaport structure to the lower support structure along a pivot axis.

3. The apparatus according to claim 2, wherein said actuating arms are each pivotally attached to said carrying tray beneath said carrying tray.

4. The apparatus according to claim 3, wherein the pivot axes of said actuating arms are parallel to the pivot axis of said tiltable support apparatus.

5. The apparatus according to claim 3, wherein said actuating arms are pivotally attached to said upper support structure of said tiltable support apparatus.

6. The apparatus according to claim 3, wherein the pivot axis of said pivot structure lies in a vertical plane parallel to the conveyor line of travel, and wherein said actuating arms remain substantially parallel to the vertical plane parallel to the conveyor line of travel during pulling down and pushing up of said actuating arms to tilt said carrier tray.

7. The apparatus according to claim 2, wherein said locking structure includes:
  (a) a pair of laterally extending locking flanges on opposite sides of said tiltable support apparatus;
  (b) a pair of locking blocks mounted to inner surfaces of said actuating arms, each locking block having locking channels that receive said locking flanges; and
  (c) a biasing member attached to both actuating arms for biasing said actuating arms towards each other so as to urge said each of said locking flanges into one of said locking channels.

8. The apparatus according to claim 7, wherein each locking block includes a locking channel associated with the tilted position of said carrying tray, and wherein each locking block includes a locking channel associated with the upright position of said carrying tray.

9. The apparatus according to claim 8, wherein each said locking flange includes a roller mounted to an outer edge thereof.

10. The apparatus according to claim 9, wherein each said locking block includes a cammed section between said locking channels over which said rollers on the outer edges of said locking flanges roll.

11. The apparatus according to claim 1, wherein said conveyor track comprises two parallel rails.

12. The apparatus according to claim 11, wherein said trailer frame base includes a longitudinal base member that extends between the two parallel rails parallel to the conveyor line of travel.

13. The apparatus according to claim 12, wherein said roller structure comprises two laterally extending roller wheel mechanisms, one roller wheel mechanism riding on each conveyor track rail.

14. The apparatus according to claim 11, wherein each said roller wheel mechanism includes an axle caster that holds a roller wheel, each said axle caster including two forks, a bearing bore disposed at a juncture between said two forks, and at least one flange bearing seated within said bearing bore and disposed around an axle shaft extending from said roller structure.

15. The apparatus according to claim 14, wherein said roller wheel is held in place in said axle caster by a nut and bolt extending through said roller wheel and both of said forks, wherein said axle caster also includes an opening on one side of said bearing bore that communicates with a space between said two forks, and wherein said at least one flange bearing is secured within said bearing bore by tightening said nut and bolt so as to inwardly flex said two forks towards each other, thereby slightly closing said opening and distorting said bearing bore.

16. The apparatus according to claim 13, wherein each conveyor track rail is supported only on an outside edge, and wherein each roller wheel mechanism comprises three roller wheels.

17. The apparatus according to claim 16, wherein each roller wheel mechanism includes an upper roller wheel for riding on a top edge of a track rail, a middle roller wheel for riding on an inside edge of the track rail, and a lower wheel for riding on a bottom edge of the track rail.

18. The apparatus according to claim 13, wherein the roller wheel mechanisms are attached to a forward end of said longitudinal base member.

19. The apparatus according to claim 1, wherein said power source comprises a linear induction motor, and wherein the driven member of said trailer frame base comprises a metal fin moved in the conveyor line of travel by said linear induction motor.

20. The apparatus according to claim 19, wherein said linear induction motor and said metal fin are both vertically oriented beneath said trailer frame base.

21. The apparatus according to claim 20, wherein said metal fin is generally parallelogram-shaped with rearwardly angled front and rear edges.

22. The apparatus according to claim 19, wherein said linear induction motor comprises two opposing out-of-phase electromagnets.

23. The apparatus according to claim 1, wherein said hitch mechanism comprises a front hitch on a front end of said trailer frame base, a rear hitch on a rear end of said trailer frame base, and a hitch connector for connecting the front hitch of one conveyor cart to the rear hitch of an adjacent conveyor cart.

24. The apparatus according to claim 23, wherein the front hitch is disposed overtop of the rear hitch.

25. The apparatus according to claim 1, wherein said trailer frame base comprises an auxiliary cart connector for connecting each tilting conveyor cart to an adjacent conveyor cart to prevent adjacent conveyor carts from separating upon failure of said hitch mechanism.

26. The apparatus according to claim 25, wherein said auxiliary cart connector comprises an electrically conductive cable connected at one end to said trailer frame base and at another end to a trailer frame base of an adjacent conveyor cart.

27. The apparatus according to claim 1, wherein said sorting conveyor includes at least one single-axis conveyor cart that comprises a tiltable support apparatus having a horizontal pivot axis that is disposed generally parallel to the conveyor line of travel.

28. A rotary actuator assembly for a tilting mechanism for a tilting cart for a sorting conveyor, said tilting cart including a carrying tray, a tiltable support apparatus and a tilting mechanism for tilting said tiltable support apparatus on said tilting cart to thereby unload objects into one of the unloading stations adjacent the conveyor, wherein said tilting mechanism includes: (i) a pair of actuating arms attached to said carrying tray on opposite sides of said tiltable support apparatus; and (ii) a pull-down mechanism associated with each unloading station for selectively pulling down one of said actuating arms so as to pull one side of said carrying tray into a tilted position, wherein each of said actuator arms includes a roller wheel on a lower end of said actuator arm and wherein said pull-down mechanism includes a descending ramp adjacent said conveyor track and a laterally pivoting switch for engaging said bumper and directing the roller wheel of a selected cart actuator arm into said descending ramp, said apparatus comprising:
  (a) an actuator arm having a first end and a second end, said pivot switch being connected to said first end of said actuator arm; and
  (b) a bi-directional actuator attached to said actuator arm second end, whereby said rotary actuator assembly is operable to rotate said laterally pivoting switch to engage said roller wheel and direct said roller wheel of a selected actuator arm into said descending ramp.

29. The apparatus according to claim 28, wherein said bi-directional actuator includes a coil spring attached to said actuator arm second end to rotate said pivot switch to said closed position.

30. The apparatus according to claim 28, further including an outer clevis coaxially aligned around said actuator arm to protect said actuator arm.

31. The apparatus according to claim 30, wherein said actuator arm includes a roll pin extending substantially perpendicular from said roll pin for connecting said actuator arm to said pivot switch and wherein said outer clevis includes an aperture, said aperture being sized to allow said roll pin to extend outward therefrom into said pivot switch.

32. The apparatus according to claim 28, wherein said bi-directional actuator is a brushless torque actuator.

33. The apparatus according to claim 32, wherein said brushless torque actuator is mounted within a heat sink.

34. A sorting conveyor for transporting objects and unloading objects at one or more unloading stations adjacent the conveyor, said sorting conveyor comprising:
 (a) a conveyor track;
 (b) a train of tilting conveyor carts connected end-to-end;
 (c) a power source for moving said conveyor carts on said conveyor track, said power source comprises a linear induction motor;
 (d) each of said tilting conveyor carts comprising: (i) a trailer frame base, including: a roller structure for engaging said conveyor track, a driven member responsive to said power source, and a hitch mechanism for connecting each tilting conveyor cart to an adjacent conveyor cart; (ii) a carrying tray for holding the objects; and (iii) a tiltable support apparatus for supporting said carrying tray above said trailer frame base and for allowing tilting of said carrying tray towards at least one side of the conveyor to unload objects into unloading stations on at least one side of the conveyor; and
 (e) a tilting mechanism for tilting said carrying tray on said tiltable support apparatus to thereby unload objects into one of the unloading stations adjacent the conveyor, wherein said tilting mechanism includes: (i) a pair of actuating arms attached to said carrying tray on opposite sides of said tiltable support apparatus; and (ii) a pull-down mechanism associated with each unloading station for selectively pulling down one of said actuating arms so as to pull one side of said carrying tray into a tilted position; wherein each of said actuator arms includes a roller wheel on a lower end of said actuator arm, and wherein said pull-down mechanism includes a descending ramp adjacent said conveyor track, a laterally pivoting switch for directing the roller wheel of a selected actuator arm into said descending ramp and a bi-directional, rotary actuator assembly connected to said laterally pivoting switch, said rotary actuator assembly including: (i) an actuator arm having a first end and a second end, said pivot switch being connected to said first end of said actuator arm; and (ii) a bi-directional actuator attached to said actuator arm second end, whereby said rotary actuator assembly is operable to rotate said laterally pivoting switch to engage said roller wheel and direct said roller wheel of a selected actuator arm into said descending ramp and for closing said laterally pivoting switch after capture of the roller wheel.

35. The apparatus according to claim 34, wherein said tilting mechanism further comprises a locking structure for locking said carrying tray in the tilted position upon pulling down of one of said actuating arms, and for locking said carrying tray in the upright position upon pushing up of said actuating arm.

36. The apparatus according to claim 35, wherein said actuating arms are each pivotally attached to said carrying tray beneath said carrying tray.

37. The apparatus according to claim 36, wherein the pivot axes of said actuating arms are parallel to the pivot axis of said tiltable support apparatus.

38. The apparatus according to claim 36, wherein said actuating arms are pivotally attached to said upper support structure of said tiltable support apparatus.

39. The apparatus according to claim 36, wherein the pivot axis of said pivot structure lies in a vertical plane parallel to the conveyor line of travel, and wherein said actuating arms remain substantially parallel to the vertical plane parallel to the conveyor line of travel during pulling down and pushing up of said actuating arms to tilt said carrier tray.

40. The apparatus according to claim 35, wherein said locking structure includes:
 (a) a pair of laterally extending locking flanges on opposite sides of said tiltable support apparatus;
 (b) a pair of locking blocks mounted to inner surfaces of said actuating arms, each locking block having locking channels that receive said locking flanges; and
 (c) a biasing member attached to both actuating arms for biasing said actuating arms towards each other so as to urge said each of said locking flanges into one of said locking channels.

41. The apparatus according to claim 40, wherein each locking block includes a locking channel associated with the tilted position of said carrying tray, and wherein each locking block includes a locking channel associated with the upright position of said carrying tray.

42. The apparatus according to claim 41, wherein each said locking flange includes a roller mounted to an outer edge thereof.

43. The apparatus according to claim 42, wherein each said locking block includes a cammed section between said locking channels over which said rollers on the outer edges of said locking flanges roll.

44. The apparatus according to claim 34, wherein said conveyor track comprises two parallel rails.

45. The apparatus according to claim 44, wherein said trailer frame base includes a longitudinal base member that extends between the two parallel rails parallel to the conveyor line of travel.

46. The apparatus according to claim 45, wherein said roller structure comprises two laterally extending roller wheel mechanisms, one roller wheel mechanism riding on each conveyor track rail.

47. The apparatus according to claim 44, wherein each said roller wheel mechanism includes an axle caster that holds a roller wheel, each said axle caster including two forks, a bearing bore disposed at a juncture between said two forks, and at least one flange bearing seated within said bearing bore and disposed around an axle shaft extending from said roller structure.

48. The apparatus according to claim 37, wherein said roller wheel is held in place in said axle caster by a nut and bolt extending through said roller wheel and both of said forks, wherein said axle caster also includes an opening on one side of said bearing bore that communicates with a space between said two forks, and wherein said at least one flange bearing is secured within said bearing bore by tightening said nut and bolt so as to inwardly flex said two forks towards each other, thereby slightly closing said opening and distorting said bearing bore.

49. The apparatus according to claim 46, wherein each conveyor track rail is supported only on an outside edge, and wherein each roller wheel mechanism comprises three roller wheels.

50. The apparatus according to claim 49, wherein each roller wheel mechanism includes an upper roller wheel for riding on a top edge of a track rail, a middle roller wheel for riding on an inside edge of the track rail, and a lower wheel for riding on a bottom edge of the track rail.

51. The apparatus according to claim 46, wherein the roller wheel mechanisms are attached to a forward end of said longitudinal base member.

52. The apparatus according to claim 34, wherein the driven member of said trailer frame base comprises a metal fin moved in the conveyor line of travel by said linear induction motor.

53. The apparatus according to claim 52, wherein said linear induction motor and said metal fin are both vertically oriented beneath said trailer frame base.

54. The apparatus according to claim 53, wherein said metal fin is generally parallelogram-shaped with rearwardly angled front and rear edges.

55. The apparatus according to claim 52, wherein said linear induction motor comprises two opposing out-of-phase electromagnets.

56. The apparatus according to claim 34, wherein said hitch mechanism comprises a front hitch on a front end of said trailer frame base, a rear hitch on a rear end of said trailer frame base, and a hitch connector for connecting the front hitch of one conveyor cart to the rear hitch of an adjacent conveyor cart.

57. The apparatus according to claim 56, wherein the front hitch is disposed overtop of the rear hitch.

58. The apparatus according to claim 34, wherein said trailer frame base comprises an auxiliary cart connector for connecting each tilting conveyor cart to an adjacent conveyor cart to prevent adjacent conveyor carts from separating upon failure of said hitch mechanism.

59. The apparatus according to claim 58, wherein said auxiliary cart connector comprises an electrically conductive cable connected at one end to said trailer frame base and at another end to a trailer frame base of an adjacent conveyor cart.

60. The apparatus according to claim 34, wherein said sorting conveyor includes at least one single-axis conveyor cart that comprises a tiltable support apparatus having a horizontal pivot axis that is disposed generally parallel to the conveyor line of travel.

61. The apparatus according to claim 34, wherein said bi-directional actuator includes a coil spring attached to said actuator arm second end to rotate said pivot switch to said closed position.

62. The apparatus according to claim 34, further including an outer clevis coaxially aligned around said actuator arm to protect said actuator arm.

63. The apparatus according to claim 62, wherein said actuator arm includes a roll pin extending substantially perpendicular from said roll pin for connecting said actuator arm to said pivot switch and wherein said outer clevis includes an aperture, said aperture being sized to allow said roll pin to extend outward therefrom into said pivot switch.

64. The apparatus according to claim 34, wherein said bi-directional actuator is a brushless torque actuator.

65. The apparatus according to claim 64, wherein said brushless torque actuator is mounted within a heat sink.

* * * * *